United States Patent
Corrigan

(10) Patent No.: US 10,710,398 B2
(45) Date of Patent: Jul. 14, 2020

(54) BICYCLE WHEEL HUB, A BICYCLE WHEEL, A BICYCLE, A METHOD OF MAKING A BICYCLE WHEEL AND A METHOD OF MAKING A BICYCLE

(71) Applicant: XTREME CARBON PTY LTD, Culburra Beach, NSW (AU)

(72) Inventor: Brian Francis Corrigan, Culburra Beach (AU)

(73) Assignee: XTREME CARBON PTY LTD, Calburra Beach, NSW (AU)

( * ) Notice: Subject to any disclaimer, the term of this patent is extended or adjusted under 35 U.S.C. 154(b) by 208 days.

(21) Appl. No.: 15/550,287

(22) PCT Filed: Jan. 5, 2016

(86) PCT No.: PCT/AU2016/050002
§ 371 (c)(1),
(2) Date: Aug. 10, 2017

(87) PCT Pub. No.: WO2016/127202
PCT Pub. Date: Aug. 18, 2016

(65) Prior Publication Data
US 2018/0029409 A1    Feb. 1, 2018

(30) Foreign Application Priority Data
Feb. 12, 2015 (AU) .............................. 2015900445

(51) Int. Cl.
*B60B 1/02* (2006.01)
*B60B 27/02* (2006.01)
(Continued)

(52) U.S. Cl.
CPC ............ *B60B 1/0215* (2013.01); *B60B 1/003* (2013.01); *B60B 27/023* (2013.01); *B60B 1/02* (2013.01);
(Continued)

(58) Field of Classification Search
CPC ....... B60B 1/003; B60B 1/0215; B60B 1/023; B60B 1/02; B60B 27/023
See application file for complete search history.

(56) References Cited

U.S. PATENT DOCUMENTS 3,922,018 A * 11/1975 Shook ................... B60B 27/023
301/110.5
5,301,778 A   4/1994 Haeussinger
(Continued)

FOREIGN PATENT DOCUMENTS

DE     203 06 761 U1    9/2004

OTHER PUBLICATIONS

Brandt, Jobst, "The Bicycle Wheel", Third Edition (1993) (147 pgs.). http://poehali.net/attach/Bicycle_Wheel_-_Jobst_Brandt.pdf.

*Primary Examiner* — Kip T Kotter
(74) *Attorney, Agent, or Firm* — Christensen, Fonder, Dardi & Herbert PLLC

(57) ABSTRACT

A bicycle wheel hub that includes a hub shell having a first end and a second end. The bicycle wheel hub also includes a first flange adjacent the first end and configured for the attachment of a first plurality of spokes, and a second flange adjacent the second end configured for the attachment of a second plurality of spokes.

15 Claims, 9 Drawing Sheets

(51) Int. Cl.
   *B60B 1/00* (2006.01)
   *B60B 23/10* (2006.01)
(52) U.S. Cl.
   CPC ......... *B60B 23/10* (2013.01); *B60B 2900/111* (2013.01); *B60B 2900/1216* (2013.01); *Y02T 10/88* (2013.01)

(56) References Cited

U.S. PATENT DOCUMENTS

| | | | |
|---|---|---|---|
| 5,332,295 A | 7/1994 | Vogel et al. | |
| 2003/0085610 A1* | 5/2003 | Addink | B60B 1/0223 301/55 |
| 2004/0262983 A1 | 12/2004 | Tanaka | |
| 2006/0181140 A1* | 8/2006 | Mercat | B60B 1/003 301/95.101 |
| 2007/0145813 A1* | 6/2007 | D'Aluisio | B60B 1/0223 301/59 |
| 2007/0145814 A1 | 6/2007 | D'Aluisio | |
| 2010/0212985 A1* | 8/2010 | Clausen | B62M 6/25 180/206.5 |
| 2013/0026815 A1* | 1/2013 | Smart | B60B 21/025 301/58 |

\* cited by examiner

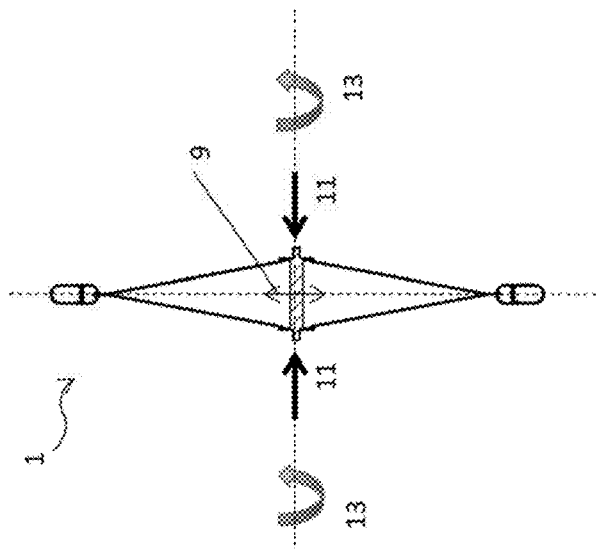
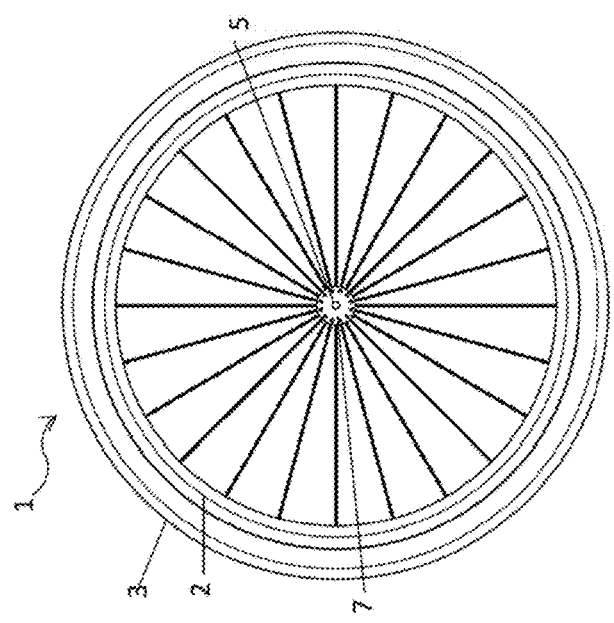
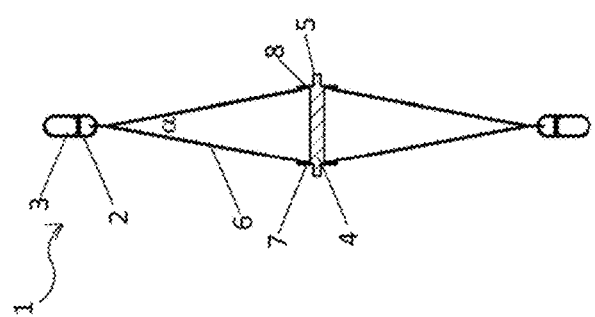

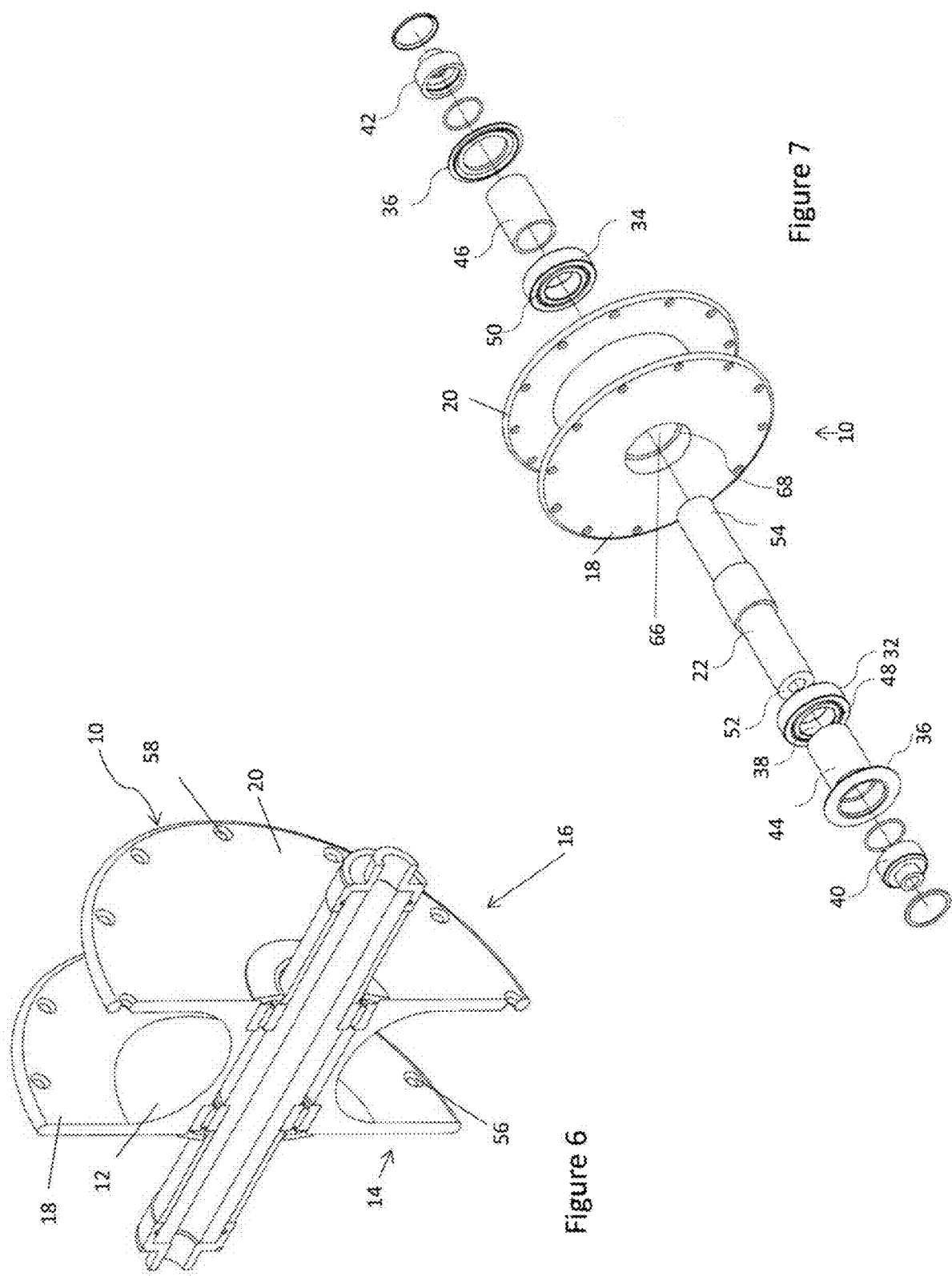

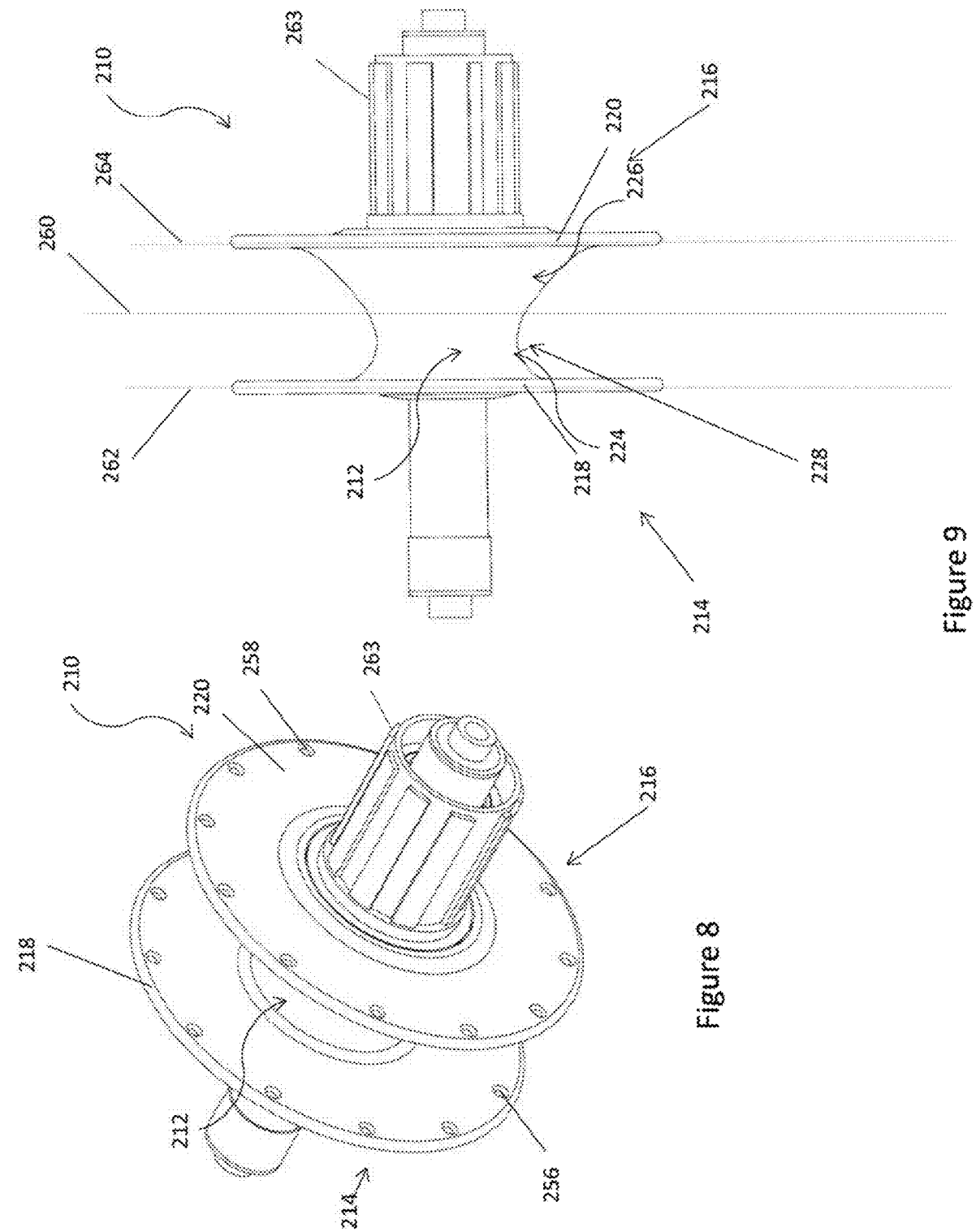

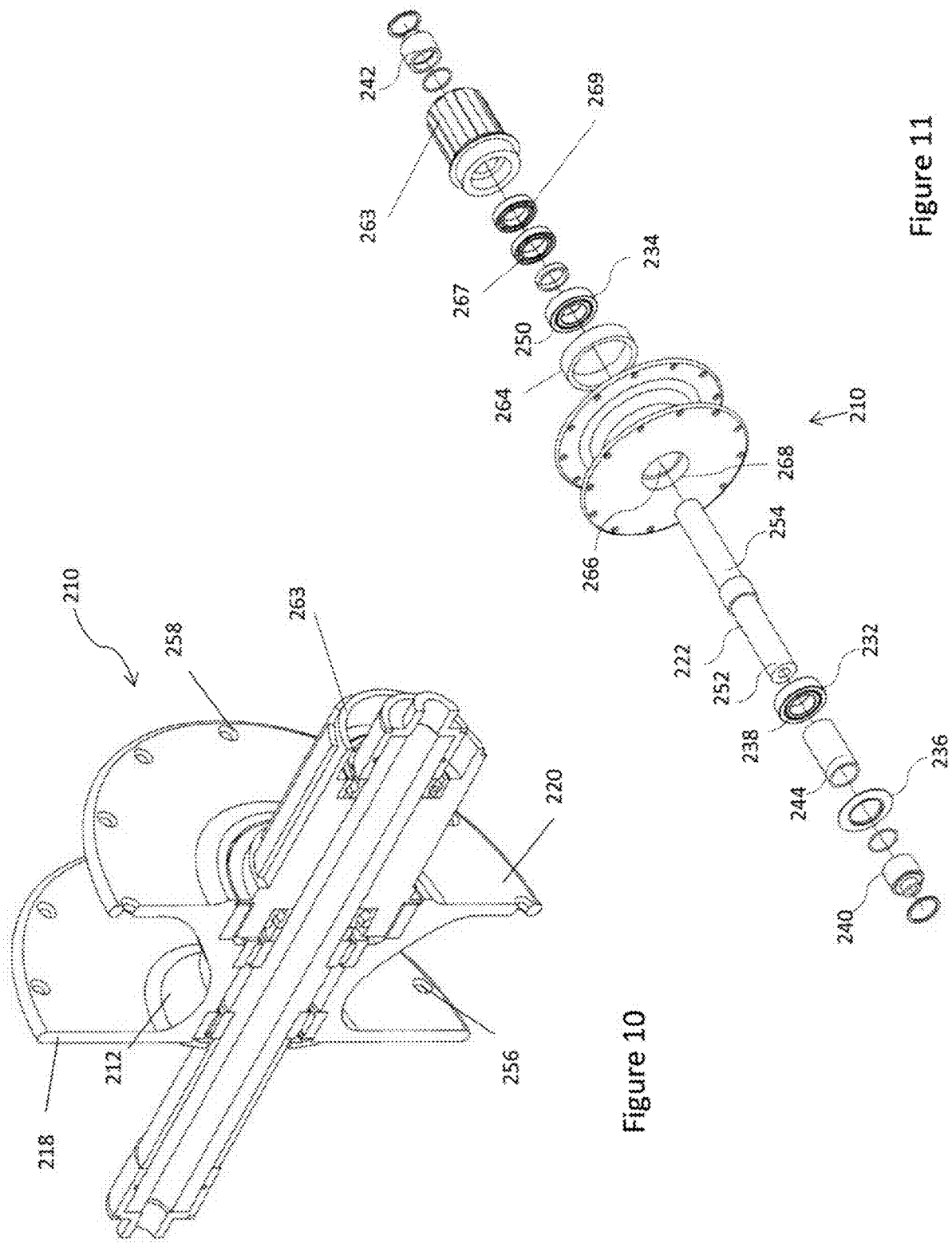

US 10,710,398 B2

BICYCLE WHEEL HUB, A BICYCLE WHEEL, A BICYCLE, A METHOD OF MAKING A BICYCLE WHEEL AND A METHOD OF MAKING A BICYCLE

This present application is a National Phase entry of PCT Application No. PCT/AU2016/050002, filed Jan. 5, 2016, which claims the benefit of Australian Provisional Patent Application No. 2015900445, filed Feb. 12, 2015, which are incorporated herein by reference.

TECHNICAL FIELD

The disclosure herein generally relates to a bicycle wheel hub, a bicycle wheel, a bicycle, a method of making a bicycle wheel and a method of making a bicycle.

BACKGROUND

Competitive cyclists, including those competing in triathlons, competitive road races, cyclo-cross races, triathlon events and time trial events for example, seek better performing bicycles and bicycle components. Lightweight materials and advanced manufacturing techniques, for example, have been used to produce bicycles and bicycle components that improve the performance of competitive cyclists.

FIG. 1 shows a section of an example of a prior art bicycle wheel 1 that may be used by many competitive cyclists, and FIG. 2 shows a side elevation view of the prior art bicycle wheel of FIG. 1. The bicycle wheel 1 has a rim 2, a tire 3 sitting on the rim 2, a hub 4 having first and second flanges 7, 8, an axle 5 disposed in the hub, and a plurality of spokes 6 extending between the rim 2 and the hub 4. The spokes are generally but not necessarily thin in cross section, for example less than 10 mm at their maximum width. Each of these spokes must continually break the wind as the wheel rotates, resulting in flow separation and increased aerodynamic drag. Bicycle wheels and their subsystems for competitive cycling are generally regulated by competitive bicycling authorities. Examples of competitive bicycling authorities include but are not limited to the Union Cycliste Internationale (UCI), and various national triathlon authorities. The UCI, for example, has technical regulations for bicycle wheels used in competitive events including road races. UCI regulation 1.3.017, for example, states that the front fork separation must be no more than 105 mm and the rear fork separation must be no more than 135 mm. Spoked wheels are stipulated by bicycling authorities for many competitive bicycling events. Competitive bicyclists seek wheels with reduced aerodynamic drag, and thus increased performance. 'Time trial' or 'triathlon' bicycle wheels that have reduced aerodynamic drag are available. They may have a 'solid', 'sandwich core' or 'hollow core' construction. These wheels, however, are not spoked wheels as stipulated by the UCI and other bicycling authorities for certain competitive events and so can not be used in these competitive events.

FIG. 3 shows some stresses and forces experienced by a bicycle wheel. Radial forces 9 are the forces within a plane of the wheel that, generally speaking, are generated by the tensioning of the spokes. The radial forces 9 position the hub and the axle at on the wheel's axis (that is, in the vertical direction when the bicycle wheel is in use). The tensioned spokes 6 are inclined with respect to the plane of the wheel and so, generally speaking, also generate lateral forces 11. The lateral forces 11 laterally centre the hub so that the hub is positioned at the plane of the wheel (that is, position the hub in the horizontal direction) when the bicycle wheel is in use. The spokes 6 of some wheel may cross (that is, a wheel may have a crossed spoke lacing pattern) and consequently generate torsional forces 13 on the hub 4 and the rim 2. The net torsional force is zero on a stationary bicycle wheel. The net torsional force is not zero, however, when a bicycle rider applies force to the bicycle's pedals, the force being transferred via a bicycle chain to the hub 4 and then through the spokes 6 to the rim 2.

Competitive cyclists generally welcome bicycle wheels of improved performance, for example aerodynamic performance. Generally a stiffer bicycle wheel may be more responsive, a characteristic sought by competitive riders. Some bicycle wheels with improved performance have been proposed but not realised because their design parameters are either unknown or cannot be realistically achieved.

Bicycle wheel builders strive to engineer wheels that have the improved performance desired by competitive cyclists. Engineering a new wheel requires determining the stresses and forces within the wheel. Bicycle wheel builders may generally design a bicycle wheel using a simplified triangular truss model of the bicycle wheel. A three dimensional vector analysis of the simple triangular truss model may be used to determine the stresses and forces within the wheel.

SUMMARY

Disclosed herein is a bicycle wheel hub. The bicycle wheel hub comprises a hub shell having a first end and a second end. The bicycle wheel hub comprises a first plurality of spoke engagers adjacent the first end and configured for attachment of a first plurality of spokes. The bicycle wheel hub comprises a second plurality of spoke engagers adjacent the second end and configured for attachment of a second plurality of spokes.

In an embodiment, a distance between the first plurality of spoke engagers and the second plurality of spoke engagers may be less than at least one of 40 mm, 30 mm and 25 mm. The distance between the first plurality of spoke engagers and the second plurality of spoke engagers may be greater than at least one of 10 mm, 20 mm and 25 mm. The distance between the first plurality of spoke engagers and the second plurality of spoke engagers may be in the range of 29 mm to 32 mm. The distance between the first plurality of spoke engagers and the second plurality of spoke engagers may be 30.5 mm.

In an embodiment, the distance between the centreline of the first plurality of spoke engagers and the centreline of the second plurality of spoke engagers is in the range of 10 mm to 40 mm. The distance between the centreline of the first plurality of spoke engagers to the centreline of the second plurality of spoke engagers may be in the range of 25 mm to 33.5 mm.

An embodiment comprises a first flange adjacent the first end and configured for the attachment of the first plurality of spokes, and a second flange adjacent the second end configured for the attachment of the second plurality of spokes. The first flange may comprise the first plurality of spoke engagers and the second flange may comprise the second plurality of spoke engagers.

In an embodiment, the distance between the first flange and the second flange may be less than at least one of 40 mm, 30 mm and 25 mm. The distance between the first flange and the second flange may be greater than at least one of 10 mm, 20 mm and 25 mm. The distance between the first flange and the second flange may be in the range of 29 mm and 32 mm. The distance between the first flange and the second flange may be 30.5 mm.

In an embodiment, the distance between the centreline of the first flange and the centreline of the second flange is in the range of 10 mm to 40 mm. The distance between the centreline of the first flange to the centreline of the second flange may be in the range of 25 mm and 33.5 mm.

An embodiment of the hub may contribute to a reduction in the aerodynamic drag. An embodiment of a bicycle wheel comprising the embodiment of the hub may have a reduced frontal area, reducing aerodynamic drag.

In an embodiment, a pitch circle diameter (PCD) of the first flange and the second flange is in the range of 50 mm to 150 mm. The pitch circle diameter may be in the range of 70 mm to 130 mm. The pitch circle diameter may be in the range of 95 mm to 105 mm.

In an embodiment, each of the first flange and the second flange has a circular circumference.

In an embodiment, the hub shell has a first concave buttress that buttresses the first flange and a second concave buttress that buttresses the second flange.

In an embodiment, the first buttress and the second buttress meet at a waist. The waist may be located midway between the first flange and the second flange. The waist may be located closer to one of the first flange and the second flange.

An embodiment comprises a first bearing encircled by the first flange and a second bearing encircled by the second flange, the first bearing and second bearing being for receiving an axle.

An embodiment comprises a plurality of bearing protectors having a curved exterior.

In an embodiment, each of the first flange and the second flange have a plurality of spoke engagers. The plurality of spoke engagers may comprise a plurality of holes. The plurality of spoke engagers may number in the range of 6 and 18.

An embodiment is for an embodiment of a wheel that is compliant with a technical regulation for a bicycle wheel. The technical regulation may be UCI regulation 1.3.017.

Disclosed herein is a bicycle wheel comprising a bicycle wheel hub, a rim, a first plurality of spokes attached to the bicycle wheel hub and the rim and a second plurality of spokes attached to the bicycle wheel hub and the rim, wherein, the first plurality of spokes and the second plurality of spokes are on opposite sides of the bicycle wheel hub, and an angle between the first plurality of spokes and the second plurality of spokes may be no more than 7 degrees.

In an embodiment, the angle between the first plurality of spokes and the second plurality of spokes may be no less than 1 degree. The angle between the first plurality of spokes and the second plurality of spokes may be in the range of 6 degrees to 7 degrees. The angle may by 6.5 degrees.

In an embodiment, the bicycle wheel hub is in accordance with the above disclosure.

In an embodiment, a radial force component of each of the first plurality of spokes and the second plurality of spokes acting on the hub is greater than 5 times that of a lateral force component of each of the first plurality of spokes and the second plurality of spokes acting on the hub shell. The radial force component of each of the first plurality of spokes and the second plurality of spokes acting on the hub may be in the range of 5 times to 50 times that of the lateral force component of each of the first plurality of spokes and the second plurality of spokes acting on the hub shell.

In an embodiment, the wheel hub may have a first bearing and a second bearing and a plurality of force transfer devices for transferring lateral clamping forces to the first bearing and the second bearing. The plurality of force transfer devices may comprise at least one of an axle end cap and an axle thrust sleeve.

In an embodiment, the rim has an effective rim diameter (ERD) in the range of 300 mm to 650 mm. The ERD may be between 450 mm and 650 mm.

An embodiment is configured to comply with at least one regulation of a competitive bicycling authority, examples of which include UCI regulation 1.3.018 and regulations of a national triathlon organisation. An embodiment may comprise bicycle fork engagers between which the hub is disposed. The bicycle fork engagers may be configured for bicycle forks compliant with UCI regulation 1.3.017. An embodiment is configured for a front wheel and for a bicycle fork having two arms that are separated by no more than 105 mm. An embodiment is configured for a rear wheel and for a bicycle fork having two arms that are separated by no more than 135 mm.

In an embodiment, each of the first plurality of spokes and the second plurality of spokes has a tension of between 500 N and 3000 N.

In an embodiment, each of the first plurality of spokes and the second plurality of spokes has a length of between 120 mm and 325 mm. Each of the first plurality of spokes and the second plurality of spokes may have a length of between 130 mm and 325 mm.

In an embodiment, the rim has at least one of a box cross-section and a curvilinear cross-section. The rim maybe hollow or sandwiched cored using any available material. The rim may have a rim depth may be in the range of 20 mm to 150 mm.

Disclosed herein is a bicycle having a bicycle wheel in accordance with the above disclosure.

An embodiment may comprise another bicycle wheel in accordance with the above disclosure.

Disclosed herein is a method of making a bicycle wheel. The method comprises the step of selecting a plurality of values for a plurality of parameters for the bicycle wheel. The method comprises the step of selecting another plurality of values for another plurality of parameters for the bicycle wheel using a pre-stressed cable strand model of the bicycle wheel. The method comprises the step of assembling a plurality of bicycle wheel components in accordance with the plurality of values for the plurality of parameters and the other plurality of values for the other plurality of parameters.

In an embodiment, the bicycle wheel is in accordance with the above disclosure.

Disclosed herein is a method of making a bicycle. The method comprises the step of installing on a bicycle frame a bicycle wheel in accordance with the above disclosure.

An embodiment comprises the step of installing on a bicycle frame another bicycle wheel in accordance with the above disclosure.

In an embodiment, the method comprises the step of making the bicycle wheel in accordance with the above disclosure. The other bicycle wheel may be made in accordance with the above disclosure.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which:

FIG. 1 shows a section of an example of a prior art bicycle wheel.

FIG. 2 shows a side elevation view of the prior art bicycle wheel of FIG. 1.

FIG. 3 shows forces experienced by bicycle wheels generally during use.

FIG. 6 shows a perspective cut away view of the bicycle wheel hub of FIG. 4.

FIG. 7 shows a perspective view of the bicycle wheel hub and example axle of FIG. 4.

FIG. 8 shows a perspective view of another embodiment of a bicycle wheel hub and another example of an axle disposed therein.

FIG. 9 shows a front elevational view of the bicycle wheel hub of FIG. 8.

FIG. 10 shows a perspective cut away view of the bicycle wheel hub of FIG. 8.

FIG. 11 shows a perspective view of the bicycle wheel hub and example axle of FIG. 8.

DESCRIPTION OF EMBODIMENTS

Figure 5:
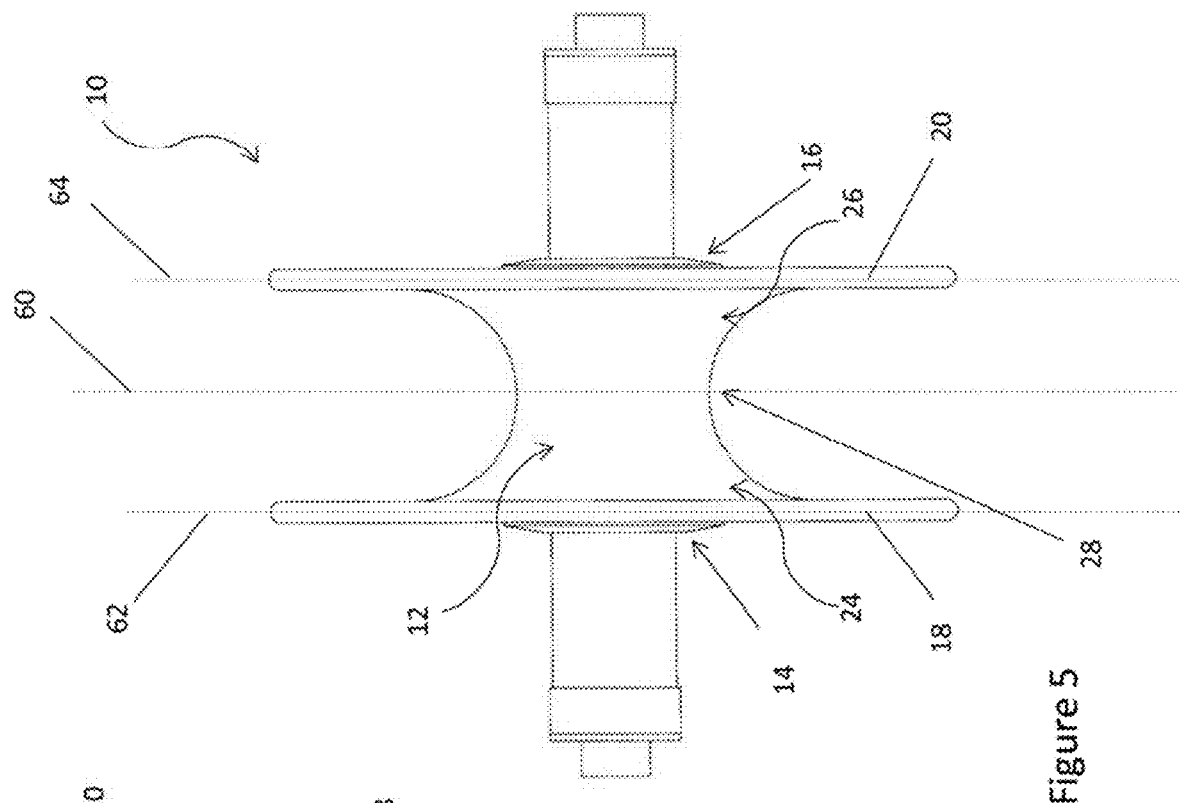
FIG. 5 shows a front elevational view of the bicycle wheel hub of FIG. 4.
Figure 4:
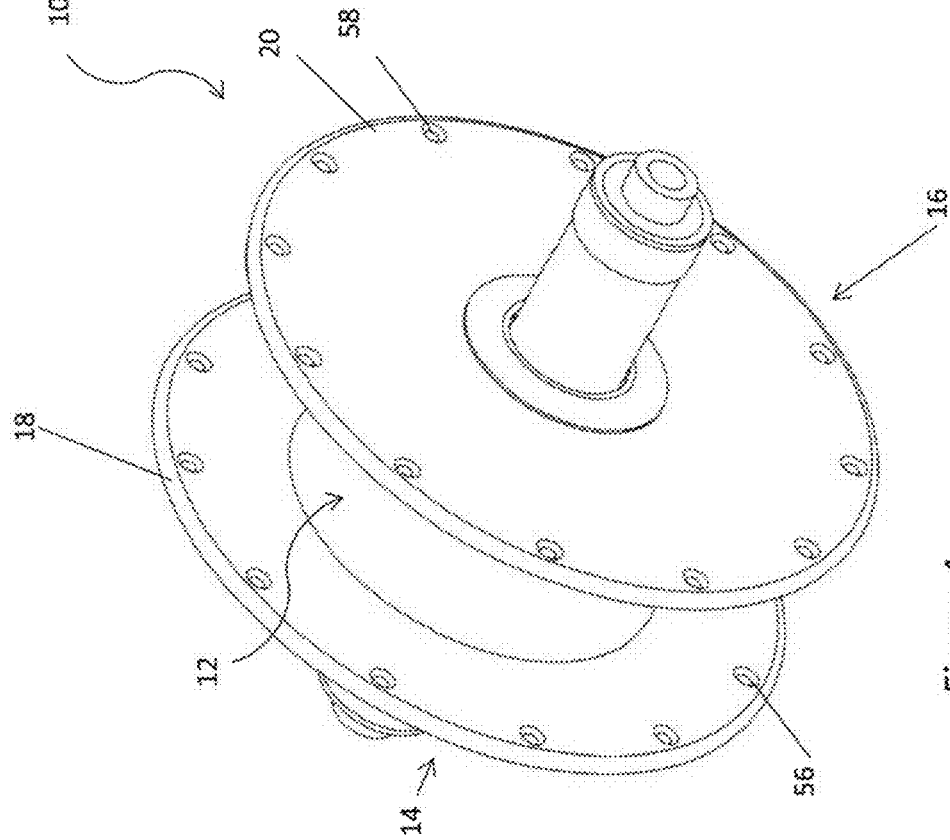
FIG. 4 shows a perspective view of an embodiment of a bicycle wheel hub and an example of an axle disposed therein.

FIGS. 4 to 7 show various views of an embodiment of a bicycle wheel hub generally indicated by the numeral 10. The bicycle wheel hub 10 has a hub shell 12 in the form of a hub tube that has a first end 14 and a second end 16 opposite the first end 14. The bicycle wheel hub 10 has a first flange 18 in the form of a transverse plate having a circular circumference adjacent the first end 14. The first flange 18 is configured for the attachment of a first plurality of spokes. The bicycle wheel hub 10 has a second flange 20 in the form of another transverse plate adjacent the second end 16. The second flange 20 is configured for the attachment of a second plurality of spokes. Generally, but not necessarily, the bicycle wheel hub 10 is for a front bicycle wheel.

FIGS. 8 to 11 show various views of another embodiment of a bicycle wheel hub 210. Generally, but not necessarily, the bicycle wheel hub 210 is for a rear bicycle wheel. Parts shown in FIGS. 8 to 11 of similar form or function to those of FIGS. 4 to 7 are indicated by similar numerals prefixed by the numeral 2. The features of hub 10 described herein may generally, but not necessarily, also be features of the hub 210. The bicycle wheel hub 210 has a hub shell 212 in the form of a hub tube that has a first end 214 and a second end 216 opposite the first end. The bicycle wheel hub 210 has a first flange 218 in the form of a transverse plate having a circular circumference adjacent the first end 214. The first flange 218 is configured for the attachment of a first plurality of spokes. The bicycle wheel hub 210 has a second flange 220 in the form of another transverse plate adjacent the second end 216. The second flange 220 is configured for the attachment of a second plurality of spokes.

Each flange 18, 20, 218, 220 has a plurality of spoke engagers 56, 58, 256, 258 defining spoke holes that in this but not necessarily in all embodiments connect opposite faces thereof. In this embodiment, but not all, the spoke engagers are integral with the flanges. The plurality of spoke engagers 56, 58, 256, 258 are arranged in a circle around the perimeter of the flange 18, 20, 218, 220 for attachment of a plurality of spokes to the flanges 18, 20, 218, 220 of the hub 10, 210. In an embodiment of a bicycle wheel 100, 102, 104 a bent end of each of the first and second plurality of spokes (e.g. a J-bend) may pass through one of the plurality of holes at a first flange 18,218 and the second flange 20,220. The bent end may have, for example, a terminating head of larger size than the one of the holes to prevent pull-through. The flanges 18, 20, 218, 220 may generally have any suitable configuration for attachment of the spokes. For example, the flanges may have a plurality of loops for receiving a plurality of hooks terminating the plurality of spokes, or may have pockets formed in the outside walls thereof. The spokes may be straight-pull spokes and the flanges may be configured to engage the ends thereof.

While in the illustrated embodiments the spoke engagers 56, 58, 356, 258 are incorporated in the flanges 18, 20, 218, 220, they may not be in alternative embodiments. The plurality of spoke engagers may comprise, for example, a plurality of projections in the form of lugs having a plurality of spoke holes, the plurality of lugs being integral to a hub shell. Generally the spoke engagers may take any suitable form.

The diameter of a circle passing through the centre of the plurality of holes 56, 58, 256, 258 of any one of the flanges 18, 20, 218, 220 is known as the pitch circle diameter (PCD).

The flanges 18, 20, 218, 220 are integral with the hub shell 12, 212. In alternative embodiments, however, the flanges 18, 20, 218, 220 may be detachable from the hub shell 12, 212. The flanges 18, 20 of bicycle wheel hub 10 are symmetrically located equally about the centre line 60 of the hub 10. The flanges 18, 20 have a flat configuration, however alternative embodiments may have a flange having an angled, curved, bent, or generally any suitable configuration. The flanges 18, 20, 218, 220 may have a PCD varying from a minimum equal to the diameter of the hub shell 12, 212 to a maximum equal to the effective rim diameter (ERD) of the chosen rim. The PCD ranges from 50 mm to 150 mm in various embodiments of bicycle wheel hubs, however a maximum value of 150 mm may result in a lighter wheel. The bicycle wheel hubs 10, 210 each have a PCD in the range of 70 to 130 mm, specifically 100 mm, however any suitable value for PCD may be used. The flanges 18, 20, 218, 220 are solid and homogeneous, however other embodiments may have flanges that are hollow and/or may have cut outs which may reduce weight. The flanges are not tapered, however alternative embodiments do have tapered flanges. The hubs 10, 210 including the flanges 18, 20, 218, 220, are constructed from carbon fibre reinforced polymer, however they may be constructed of any suitable material, examples of which include 6061, 7075 aluminium alloys, a suitable metal and a suitable metallic alloy.

Figure 13:
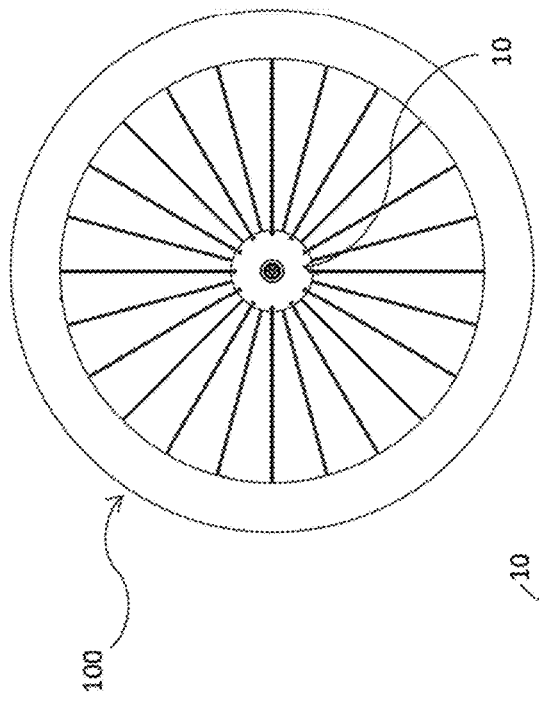
FIG. 13 shows a side elevation view of the bicycle wheel of FIG. 12.
Figure 12:
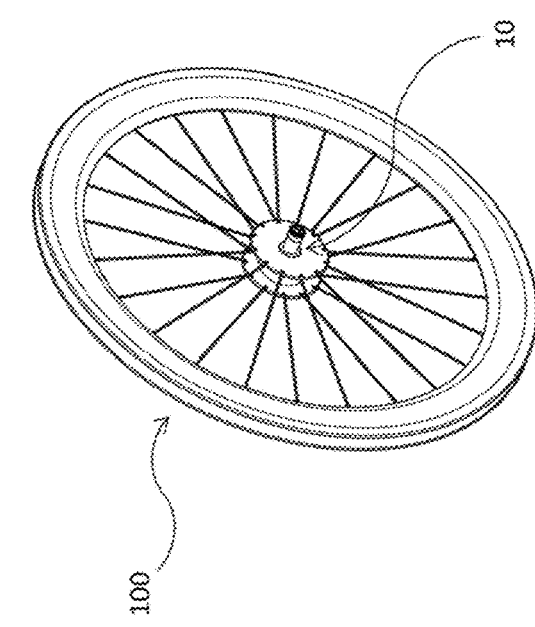
FIG. 12 shows an isometric view of an embodiment of a bicycle wheel having the hub of FIG. 4 which is engaged with a first plurality of spokes and a second plurality of spokes each arranged in a radial spoke lacing pattern.
Figure 14:
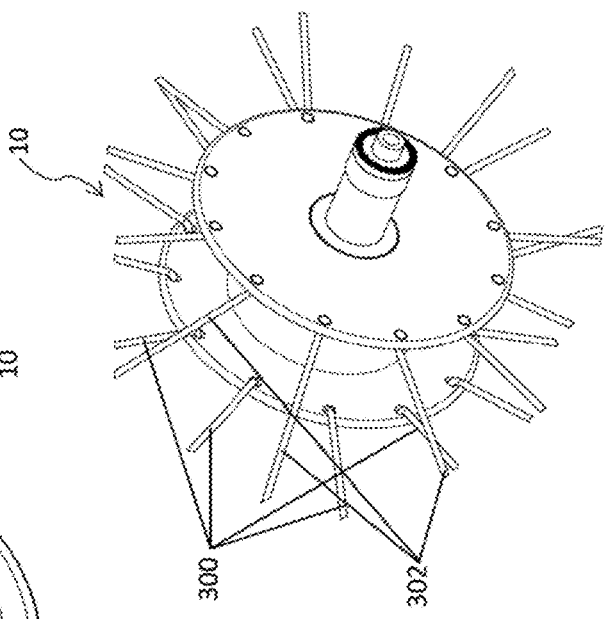
FIG. 14 shows a detail of the hub of FIG. 12.
Figure 16:
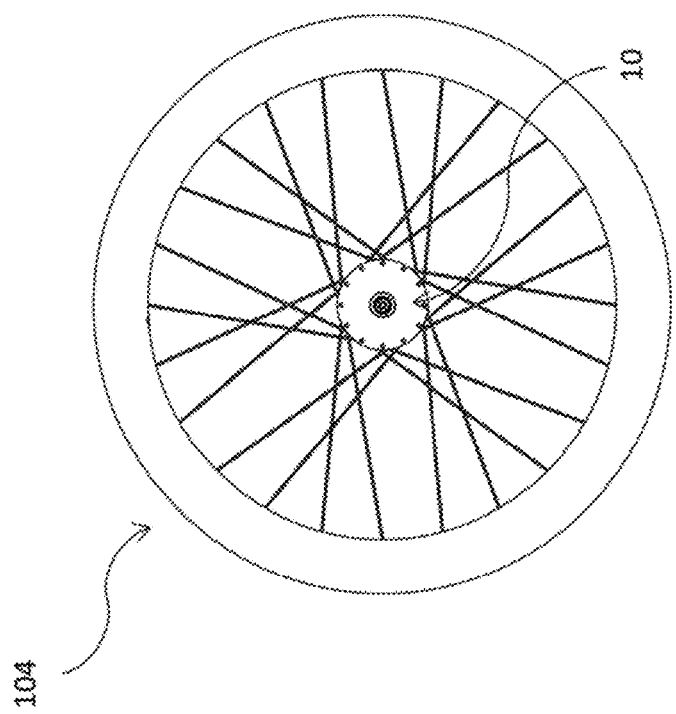
FIG. 16 shows a side elevation view of an embodiment of a bicycle wheel having the hub of FIG. 4 which is engaged with a first plurality of spokes and a second plurality of spokes arranged in a 2-cross spoke lacing pattern.
Figure 15:
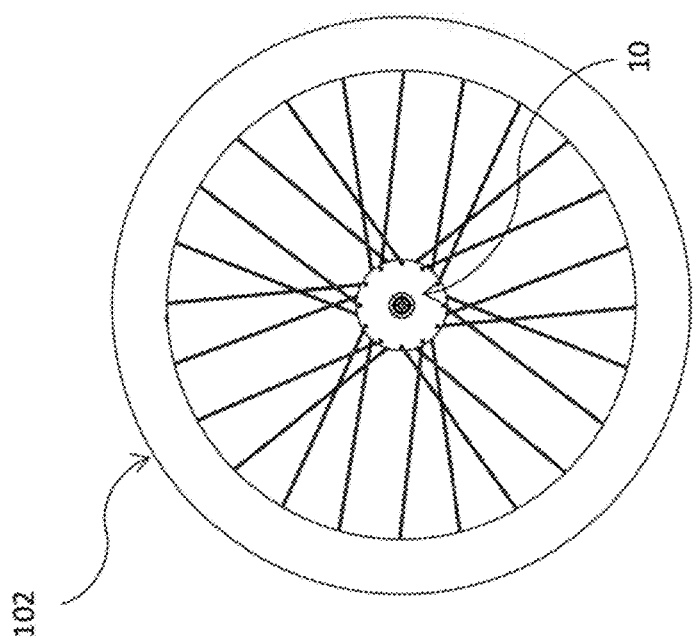
FIG. 15 shows a side elevation view of an embodiment of a bicycle wheel having the hub of FIG. 4 which is engaged with a first plurality of spokes and a second plurality of spokes each arranged in a 1-cross spoke lacing pattern.
Figure 18:
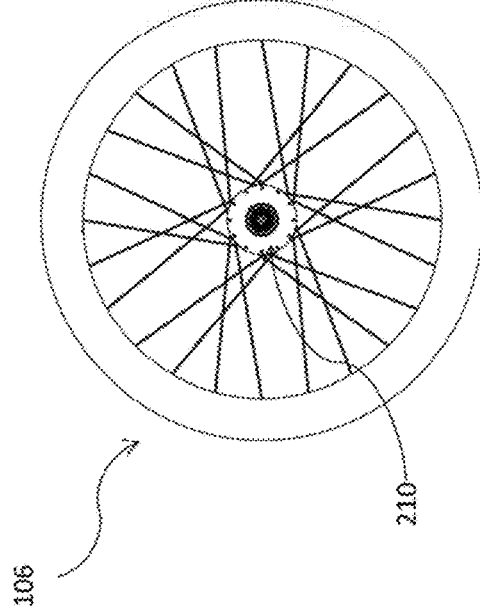
FIG. 18 shows a side elevation view of the bicycle wheel of FIG. 17.
Figure 20:
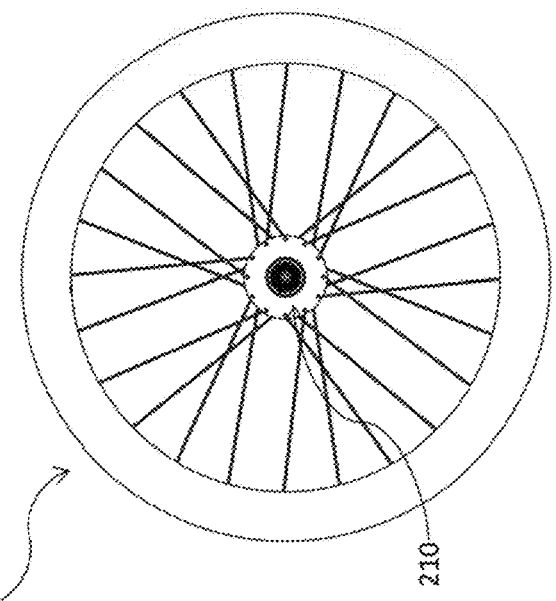
FIG. 20 shows a side elevation view of an embodiment of a bicycle wheel having the hub of FIG. 8 which is engaged with a first plurality of spokes and a second plurality of spokes each arranged in a 1-cross spoke lacing pattern.
Figure 17:
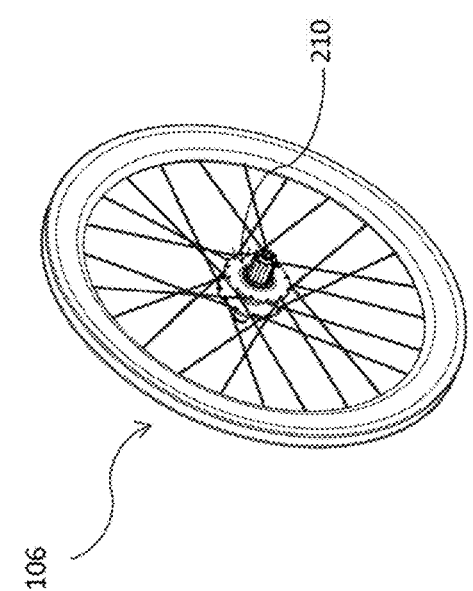
FIG. 17 shows an isometric view of an embodiment of a bicycle wheel having the hub of FIG. 8 which is engaged with a first plurality of spokes and a second plurality of spokes each arranged in a 2-cross spoke lacing pattern.
Figure 19:
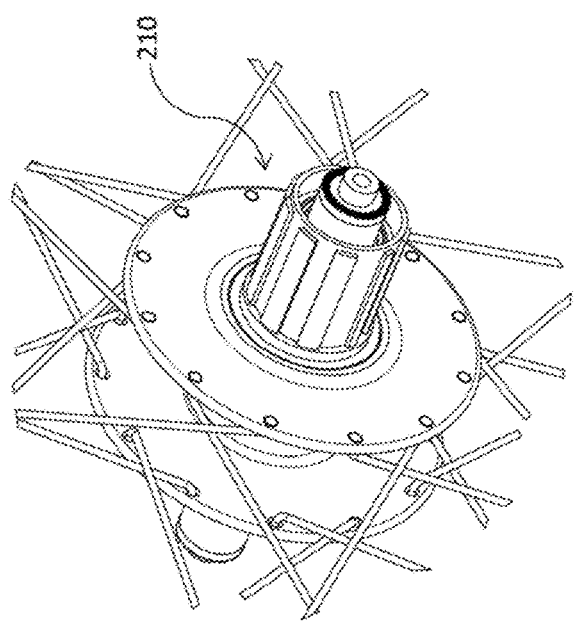
FIG. 19 shows a detail of the hub of FIG. 17.

The hub 10,210 may be incorporated in various embodiments of bicycle wheels. FIGS. 12 and 13 show isometric and side elevation views respectively of an embodiment of a wheel 100 having the hub of FIG. 4, wherein a plurality of spokes thereof have a radial lacing pattern. FIG. 14 shows a detail of the hub 10 of the wheel of FIG. 12. FIGS. 15 and 16 show side elevation views of wheels 102,104 having the hub of FIG. 4 and a 1-cross spoke lacing pattern and a 2-cross lacing pattern respectively. FIGS. 17 and 18 show isometric and side elevation views respectively of an embodiment of a wheel 106 having the hub 210 of FIG. 8, wherein the plurality of spokes thereof have a 2-cross lacing pattern. FIG. 19 shows a detail of the hub 210 of the wheel of FIGS. 17 and 18. FIG. 20 shows a side elevation view of an embodiment of a wheel 108 having the hub 210 of FIG. 8 and a 1-cross spoke lacing pattern. It will be appreciated that the wheels of FIGS. 17-20 may alternatively have a radial spoke lacing pattern. Hub 210 has centreline 260 and flange centrelines 262 and 264.

Embodiments of bicycle wheel hubs 10, 210 and embodiments of bicycle wheels 100, 102, 104 having the embodiments of the bicycle wheel hubs 10, 210 may generally experience less aerodynamic drag in use than a prior art bicycle wheel hub and a prior art wheel. Bicycle wheel embodiments that uses the bicycle wheel hub embodiments 10, 210 may have a smaller frontal area than that of prior art bicycle wheels. The frontal area of a bicycle wheel is generally the area bounded by the spokes (see FIG. 1, for example). The frontal area is dependent on the separation between the first and the second flange 18, 20, 218, 220 which in prior art bicycles is generally in the range of 47 mm to 80 mm. The reduction in frontal area may reduce the aerodynamic drag force as encountered by the bicycle wheel system as it moves through the air in normal usage. This reduction of aerodynamic drag can be calculated using the drag force equation from *Theory of Wing Sections* (1960) by Abbott and Doenhoff Dover Publications, Inc, New York:

$$F_d = 0.5(p \cdot C_d \cdot A \cdot V^2)$$

where $F_d$=aerodynamic drag force (N), p=density of air, $C_d$=coefficient of drag, V=velocity (m/sec), and A=frontal area of the bicycle wheel (m²). The Coefficient of drag varies insignificantly for wheels having various frontal areas. The density of air also varies insignificantly in the case of a bicycle. The calculated drag force $F_d$ of the bicycle wheel, however, is proportional to the frontal area A of the bicycle wheel. The reduction in the drag force results in an increase in the performance of the rider and bicycle system, generally in the form of a decrease in the applied power required by the rider to maintain a constant velocity of the rider and bicycle system.

The angle between the first plurality of spokes and the second plurality of spokes at the bicycle wheel rim is defined by FIG. 1 and indicated by 'α'. The angle α between the first plurality of spokes and the second plurality of spokes of embodiments may be no more than 7 degrees and no less than 1 degree. The embodiments shown in the figures have an angle between the first plurality of spokes and the second plurality of spokes in the range of 6 degrees to 7 degrees, specifically 6.5 degrees, although alternative embodiments may have various angles.

The distance between the first flange and the second flange may be less than at least one of 40 mm, 30 mm and 25 mm. The distance between the first flange and the second flange may be greater than one of 10 mm, 20 mm and 25 mm. The distance between the first flange and the second flange may be in the range of 29 mm and 32 mm. In the embodiments shown in the figures, the distance between the first flange and the second flange may be 30.5 mm, however not all embodiments are so configured. Expressed differently, the distance between the centreline of the first flange and the centreline of the second flange may be in the range of 10 mm to 40 mm. The distance between the centreline of the first flange to the centreline of the second flange is, in the embodiments shown in the figures, in the range of 25 mm and 33.5 mm, however not all embodiments are so configured.

The tables 1 and 2 in the annexure respectively show calculated frontal areas, and the angles between the first plurality of spokes 300 on one side of the hub 10 and the second first plurality of spokes 302 on another side of the hub, for of an embodiment of a wheel having various centreline-to-centreline flange separations. Some of the first plurality of spokes and the second plurality of spokes are labelled in FIG. 14, for example. The effective rim diameter (ERD) of the embodiment of the wheel is 620 mm. The ERD for a bicycle wheel is a measure of the diameter of the wheel and is, in the context of this document, the distance between the head of a first spoke nipple installed on the bicycle wheel and the head of second installed spoke nipple installation on the bicycle wheel diametrically opposite the first spoke nipple. Other embodiments may have a greater or smaller ERD, as appropriate or suitable.

Designing embodiments of a bicycle wheel (for example, wheels 100, 102, 104, 106, 018) requires a model of the wheel which is used to predict the stresses and forces within the wheel, and may include parameters for at least one of (or all of) spoke tension, spoke lacing pattern, spoke length, and the selected rim and its properties. The stresses and forces experienced by an embodiment of a bicycle wheel 100,102, 104,106,108 may be substantial and unless managed may result in reduced performance or catastrophic failure of the bicycle wheel causing injury or death.

As disclosed above, a bicycle wheel builder may generally use a simplified triangular truss model that uses three dimensional (3D) vector analysis to determine the wheel's stresses and forces.

The simplified triangular truss model assumes that:
joints between idealised truss elements, including joints between the spokes and the rim, and spokes and the hub, are friction free pin joints;
the truss elements, including those for the spokes, rim and hub, are rigid and do not bend or deflect;
the truss elements, including the spokes, have a homogeneous cross section; and
the truss elements are only subjected to tension and compression forces.

As is demonstrated herein, the simplified triangular truss model does not reflect reality because of at least one of the above assumptions. The flawed and erroneous assumptions of the simplified triangular truss model for the bicycle wheel may have prevented the design and construction of embodiments of bicycle wheels disclosed herein.

The applicant has found that removing at least one of these assumptions from the model generally provides significantly different values. In particular, a pre-stressed cable and strand model of embodiments of a bicycle wheel with at least one of and in some embodiments all of the following features provides more realistic values for wheel stresses and forces:

The joints between elements, including joints between the spokes and the rim, and the spokes and the hub, experience friction;

the elements are not rigid and are able to bend and deflect with applied forces and stresses;

the elements, where appropriate and/or suitable, are not homogeneous in cross section, and forces and bending moments are not assumed to be linear along the elements;

the elements are subject to tension and compression forces, bending forces, as well as forces resulting from torque and angular momentum.

A pre-stressed cable and strand model of an embodiment of a bicycle wheel with the above features more accurately reflects reality and therefor is relevant and credible, unlike simplified triangular truss models of bicycle wheels that are erroneous in the view of physics and engineering.

Tables 3 to 18 each disclose values for the radial force and the lateral force exerted by each bicycle wheel spoke in an embodiment of a bicycle wheel having a radial lacing pattern and an ERD of 620 mm, for various centreline-to-centreline flange separations as determined by a simplified triangular truss model. These values should be compared to those at the left side of tables 13 to 18 that each disclose values for the radial force and lateral force exerted by each bicycle wheel spoke in the embodiment of the bicycle wheel having a radial lacing pattern and an ERD of 620 mm for various centreline-to-centreline flange separations as determined by a pre-stressed cable strand model. Comparing tables 3 to 12 with the corresponding tables 13 to 18, it may be concluded that the predicted lateral forces generated by a radial spoke is underestimated by the simplified triangular truss model. The predicted values for lateral force in table 13 are approximately twice that in table 3, for example.

The difference in the predicted lateral forces is significant. Using the simplified triangular truss model may result in a wheel that does not have the predicted properties and thus not have the required performance or may fail and cause injury or death. For example, an embodiment of a wheel with a 30 mm centreline-to-centreline flange separation that has sufficient lateral stability for racing may require a lateral force of around 100 N. Table 3 predicts that the spoke tension required to achieve a lateral force of 100 N is in excess of 2000 N. A spoke tension of 2000 N is not supported by many rims. Consequently, a wheel builder may conclude that building an embodiment of a wheel with 100 N of lateral force for stability is not possible.

Wheel builders have concluded that the smallest feasible centreline-to-centreline flange separation is approximately 50 mm because the desired stability and stiffness cannot be achieved. Values in Table 5 calculated using the simplified triangular truss model predicts lateral forces for an embodiment of a bicycle wheel with a 50 mm centreline-to-centreline flange separation; the simplified truss model predicts that 100 N of lateral force (that is, the lateral force required for an embodiment of a wheel of sufficient stability) can be achieved with a spoke tension of around 1275 N, which is generally considered to be approximately the upper limit for spoke tension.

Table 13, however, with values generated by a pre-stressed cable strand model, predicts that the centreline-to-centreline flange separation may be reduced to 30 mm and the spoke tension set to approximately 1079 N for approximately 100 N of lateral force. This model predicts that spoked bicycle wheels of unprecedented thickness are possible.

A spoke tension may be supported by some rims, however the simplified triangular truss model does not account for elastic and/or plastic elongation of spokes ("creep" or "deformation"), and consequently the spoke tension may on the race day be less than that set by the wheel builder. Creep may be evident for spoke tensions greater than 1000 N. The pre-stressed cable strand model may include elastic and/or plastic deformation.

The applicant is of the view that wheel builders generally would not consider building a wheel with reduced frontal areas and improved aerodynamics in view of the predictions of the simplified triangular truss model.

The applicant, however, can design embodiments of a bicycle wheel having reduced frontal areas and improved aerodynamics using the tables 13 to 19. The applicant has determined that it is possible to design a bicycle wheel having the desired stability, stiffness and strength while having a reduced inter-flange distance (e.g. in the range of 25 mm to 40 mm) to reduce bicycle wheel aerodynamic drag forces with the pre-stressed cable and strand model. The resulting bicycle wheel may have a reduced frontal area while maintaining the stability and stiffness.

The applicant has determined that a reduction in the centreline flange to centreline flange dimension for a hub and axle system to the range 40 mm to 25 mm when compared to a hub and axle system having a centreline flange to centreline flange dimension in the range 80 mm to 40 mm will result in insignificant difference in the radial component of the forces, insignificant difference in the torsion component of the forces, but a significant reduction in the lateral force component of, for example, between 40 to 50%, assuming a radial spoke lacing arrangement. It is erroneous, as other wheel designers may believe, that a reduction in the centreline flange to centreline flange separation to the range 40 mm to 25 mm results in no change or an increase in the lateral forces applied by the spokes. If this was true, a reduction in centreline flange to centreline flange separation would increase the lateral strength of the bicycle wheel system. This may be generally false, because the applicant has determined that a reduction in the centreline flange to centreline flange separation may generally result in a decrease in the lateral force components, reducing overall stability and stiffness of embodiments of a bicycle wheel. The applicant has demonstrated herein how to compensate for the reduced lateral forces, using the pre-stressed cable strand model.

Tables 19-21 show lateral forces predicted by the pre-stressed cable and strand model by the applicant for changing flange PCD for various spoke numbers ("holes") in embodiments of a bicycle wheel. The results in tables 19-21 show that a pitch circle diameter of the flanges between 50 mm to 150 mm may increase the frontal area of the wheel marginally (0 to 1%), however the resulting wheel may generally benefit from increased stability and stiffness due to the reduction in the length of the spokes which result may in a decrease in the slenderness ratio of the spokes.

In addition to the above considerations, the following may be considered when designing an embodiment of a bicycle wheel:

Spoke tension may generally range from zero up to the maximum spoke tension that a rim can support. Carbon fibre rims may be configured for a maximum spoke tension of 3000 N, for example. Alloy rims may be configured for a spoke tension of 750 N to 1500 N, for example. An embodiment of a bicycle wheel has a spoke tension of 1500N, which may be considered sufficient for a stiffness and rigidity. In order to analyse and quantify this variable accurately in the bicycle wheel system it is necessary to use the pre-stressed cable and strand model for the bicycle wheel, not a simplified triangular truss model, and 3 dimensional ("3D") vector analysis and projective geometry. Using the pre-stressed cable and strand model it is possible to achieve an increase in the applied spoke tension which may result in an increase in the stiffness or rigidity of the bicycle wheel system.

Figures 21, 22:
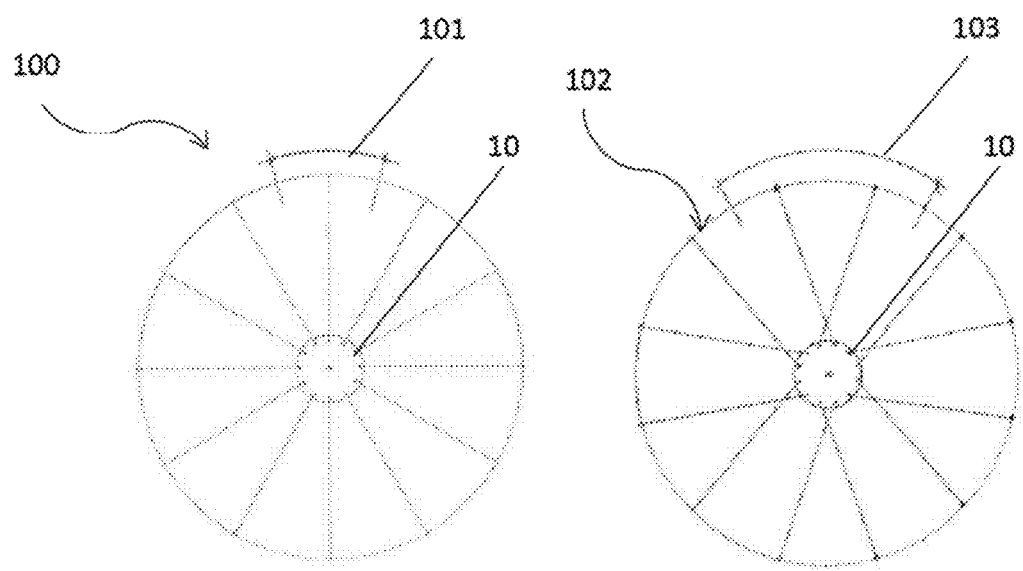
FIGS. 21 to 23 show side elevation views of the wheels of FIGS. 13, 15, 16 and their respective effective arc lengths.
Figure 23:
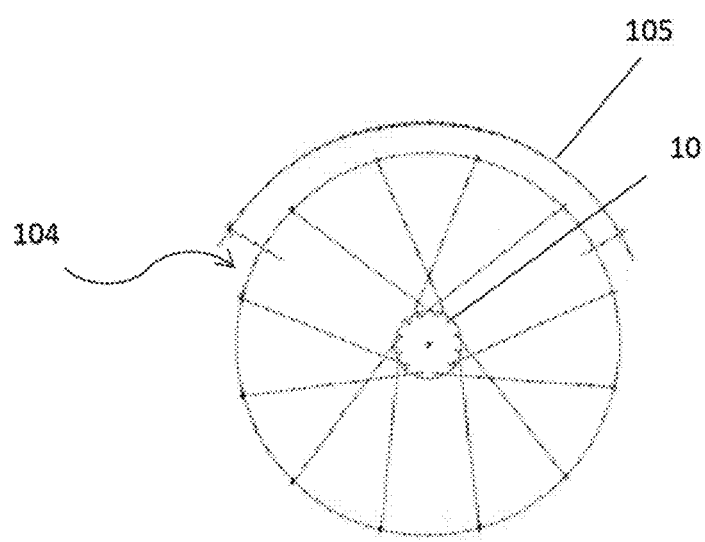

Spoke lacing pattern is generally described as radial, or 1-cross, 2-cross, 3-cross, or 4-cross. Effective rim arc length may be considered. Effective rim arc length is the arc length of the rim over which the forces generated by the selected spoke lacing pattern are distributed. FIGS. 21 to 23 show wheels 100, 102 and 104 and their respect effective arc lengths 101, 103 and 105. Unlike previous models that model each spoke in a cross laced spoke arrangement as a radially laced spoke, and which assumes two dimensional (2D) vector component forces, the pre-stressed cable strand model may determine the actual forces associated with a crossed laced spoke arrangement. The pre-stressed cable strand model may also take into consideration the effective rim arc length that is being analysed. The pre-stressed cable strand model may account for the actual number of spokes of each alternate spoke lacing pattern that are acting on this effective rim arc length. A change in the spoke lacing pattern from radial to 1-cross to 2-cross to 3-cross to 4-cross may result in an increase in the stiffness or rigidity of the bicycle wheel system. This increase in stiffness can be quantified by the predicted radial, lateral and torsional forces. Table 9 shows multiplication values that can be applied to the lateral and radial forces predicted by the tables 13 to 18 (and also 3 to 8) to obtain predicted forces in embodiments of bicycle wheels having any one of a 1-cross spoke lacing pattern, a 2-cross spoke lacing pattern, a 3-cross lacing pattern and a 4-cross lacing pattern.

The total number of spokes for a wheel is generally an even number because a wheel has two sides. Opposing side forces may be balanced with the same number of spokes on each side. UCI regulation 1.3.018 stipulates that the minimum number of spokes per wheel is 12. It also describes a traditional, standard or conventional bicycle wheel and stipulates that these wheels must have a minimum of 16 spokes per wheel. The maximum number of spokes per wheel is only limited by the rim circumference but the norm is 36. Embodiments may have 16, 20, 24, 28, 32 or 36 spokes, for example, or generally any suitable number of spokes. An increase in the number of spokes may proportionally increase the stiffness or rigidity of the bicycle wheel system. This increase in stiffness may be quantified by the pre-stressed cable and strand model. Table 10 shows multiplication values that can be applied to the lateral and radial forces predicted by the tables 14 to 19 (and also 3 to 12) to obtain predicted forces in embodiments of bicycle wheels having different numbers of spokes.

Spoke length may affect the stiffness and stability of the wheel. Table 12 demonstrates the effect of rim depth and centreline-to-centreline flange separation on other bicycle wheel variables. The influence of spoke length may be calculated and quantified by using critical buckling theory, the critical buckling load, and the slenderness ratio. A small value of the slenderness ratio may equate to a large critical load capacity, which translates as a stiffer spoke. Generally the shorter the spoke length the stiffer the resulting spoke as a structural element which means a stiffer and more stable bicycle wheel. The length of spoke may be dependent upon other variables examples of which include but are not limited to rim depth, distance between the flange centrelines 62, 64, alignment of the left and right of the hub flanges 18, 20 about the centre line 60 of the wheel, and pitch circle diameter.

Rim design. Generally, a wheel builder may select an existing rim that is suitable for the riding conditions, for example a rim for a steep decent or a rim for a time trial. The depth of the rim may affect the stability and stiffness of the bicycle wheel, the spoke length and sub-tended angle at the spoke-to-rim interface, buckling stability, torsional stability, hoop and radial stress of the tyre-to-rim interface and the spoke-to-rim interface. The bicycle wheel embodiments disclosed herein may have a tyre inflated to no more than 130 psi to 145 psi (896-1000 kPa), 100 psi or generally any suitable pressure. The inflation pressure may be distributed as a hoop and radial stress at the interface structure between the rim and tyre. The spoke to rim interface may transfer stress/force between the spokes and the rim. This interface may be an annular ring section contained within or integral with the rim and subject to the combined loading of the spoke sub system, which may result in hoop and radial stress/force in this section. The spoke pull-out stress/force encountered due to the tensioning of the spokes. The rim may be configured to withstand a spoke tension of 3000 N (the "pull out force") in each of the plurality of spokes. Additional to these specific interface variables the structural integrity of the rim as a whole structural element may be considered as a variable as this rim is responsible for the transference of road forces through the bicycle wheel system to the frame of the bicycle. The effective rim arc length may be considered as the dimension variable over which the design stress/force act and not as the actions of a single point load acting at the intersection of the tyre and road surface. The use of a single point load as the design variable may be acceptable for the ideal experiment or as a first approximation of a more exact structural analysis but may result in an under-design of the critical buckling strength of a box shaped rim, for example, unless the effective rim arc length is used. The rim depth may affect the overall stability and stiffness of the bicycle wheel system. As the rim depth is increased the corresponding shortening of the spokes may result in a decrease of the slenderness ratio of the spokes, which may increase the stiffness of the wheel (refer to Table 12). The rim may be further subjected to the torsional buckling loads that are associated with the cornering of the wheel system which may be analysed by torsion theory with the load distributed over the effective rim arc length and not as a single point load. The UCI does not stipulate a design load for the rider and bike system, however a combined load of 100 to 120 kg may be used and apportioned 40%:60% (front:rear wheel) for design purposes, however other values may be used as appropriate.

It was determined by the applicant that the radial force component is of an order of 10 times (between 5 and 50 times, for example) that of the lateral force component acting at the hub 10, 210. This indicates that the radial force component may be the main force component that contributes to the stability and the overall strength of embodiments of a bicycle wheel 100-104.

Similarly an increase in the stability and stiffness of the wheel may result from a reduction in spoke length resulting from an increase in the rim depth of the rim, as demonstrated by table 11.

The aerodynamic drag force experienced by an embodiment of the hub 10, 210 is influenced by its shape. The hub embodiments 10, 210 each have a hub shell 12, 212 having a curvilinear profile that enhances airflow over the hub shell 12,212 which may reduce aerodynamic drag. This curvilinear profile may enhance the structural connection of the hub flanges 18,20, 218, 220 to the hub shell 12, 212 increasing the structural integrity of the hub and axle system.

The hub shell 12 is located between the first flange 18 and the second flange 20. The hub shell 12 has a first concave buttress 24 that buttresses the first flange 18 and a second concave buttress 26 that buttresses the second flange 20. The first buttress 24 and the second buttress 26 meet at a waist 28. The waist 28 is located midway between the first flange 18 and the second flange 20 in the front wheel hub 10 shown in FIGS. 3 to 6. The hub shell 212 of bicycle wheel hub 210 is located between the first flange 218 and the second flange 220. The hub shell has a first concave buttress 224 that buttresses the first flange 218 and a second buttress 226 that buttresses the second flange 220. The first buttress 224 and the second buttress 226 meet at a waist 228 located closer to one of the first and second flange in the rear hub 210 of FIGS. 9-11.

The hubs 10, 210 each have at least one bearing, in this embodiment two bearings 32, 34, 232, 234. The bearings 32, 34, 232, 234 are the interface between the each hub 10, 210 and its axle 22, 222. The bearings 32, 34, 232, 234 are disposed within the hub 10, 210. The hub 10, 210 has a central passageway 66, 266 having a first internal step defining a first bearing seat 68, 268 and a second internal step defining a second bearing seat. When installed, the first bearing 32, 232 is pressed into a first opening of the passageway until engaged by the first seat 68, 268. The central passageway 66 is dimensioned such that an interference fit exists between the first bearing 32 and the central passageway 66. The second bearing 34 is similarly installed. Bearings may be located inboard, inline or outboard of the hub flanges 18, 20, 218, 220. The bearings 32, 34, 232, 234 are located in line with the flanges 18, 20, 218, 220 of the hub 10, 210 to reduce the frontal area of the hub and axle sub system which may reduce of aerodynamic drag and improves performance.

The bearings 32, 34, 232, 234 comprise sealed bearings. Other embodiments may comprise non-sealed bearings or generally any suitable form of bearing. The bearings may be capped by bearing caps or external seals 36, 236, that are curvilinear in profile and therefore exhibit an enhanced aerodynamic profile in the direction of rotation of the bicycle wheel system. An enhanced aerodynamic profile of the bearing cap may result in a reduction of the aerodynamic drag.

Axle end caps 40,42,240,242 cap the axles 54, 254. Force transfer devices comprising the end caps 40, 42, 240, 242 and axle thrust sleeves 44,46,244 transfer clamping forces by the bicycle fork(s) and/or dropouts of the bicycle frame on the end caps 40,42 to the inner races 48,50 of the bearings 32,24. Bicycle fork engagers in the form of the axle end caps 40,42,240,242 engage the bicycle forks in use. The hub 10,210 is disposed between the axial end caps 40,42,240, 242. The bicycle fork engagers of hubs 10,210 are configured for bicycle forks compliant with UCI regulation 1.3.017. Hub 10 is configured for a front wheel and for engaging a bicycle fork having two arms that are separated by no more than 105 mm (i.e. UCI compliant). Hub 210 is configured for a rear wheel and for engaging a bicycle fork having two arms that are separated by no more than 135 mm (i.e. UCI compliant).

These components can be constructed from any known and available material. The axle is subject to an applied axial force as a result of fixing the bicycle wheel 100, 102, 104 to the forks of the bicycle frame. The applied axial force is generally in the range of 4000 N to 8000 N in order to maintain stability and stiffness of the bicycle wheel 100, 102, 104, although values below or above this range may be acceptable. The applied axial force is transferred from the bike frame to the axle end caps 40, 42, 240, 242, the axle 22, 222 and the axle thrust sleeves 44, 46, 244. The axle end caps 40, 42, 240, 242 engage the distal ends 52, 54, 252, 254 of the axle shaft 22, 222 and the axle thrust sleeves 44, 46, 244 to transfer the applied axial force to the inner bearing races 38, 50, 238, 250 which results in the bearings 32, 34, 232, 234 and hub shell 12, 212 being located on the axle shaft 22, 252. Without this arrangement the bearings 32, 34, 232, 234 and hub shell 12, 212 would be free to translate along the axle shaft 222. The result of any such translation would mean that the hub 10, 210 and axle 22, 222 would be non-functional.

The axle 22, 222 can be constructed of any known and available material, for example steel, metal alloy or carbon fibre reinforced polymer, and it may generally have the flexural modulus (E) in the range 50 GPa to 100 GPa with an outside diameter of 15 mm, 17 mm or 20 mm. Other values may be acceptable. The cross sectional dimensions of the axle shaft are responsible for determining the design variable known as the Moment of Inertia (I)(mm$^4$). Both of these variables relate to the range of deflection experienced at the distal ends of the axle 22 during normal motion of the bicycle wheel 100, 102,104. Deflection of the distal ends of the front 22 and rear 222 axle shafts in the range 100 micron to 300 micron may be acceptable. Deflection may be calculated using the slope-displacement theory of structural analysis. Excessive deflection of the distal ends of the axle shaft over time may result in a fatigue failure of the axle 22 which will result in a catastrophic failure of the hub 10, 210 and/or bicycle wheel 100, 102, 104.

The tire may be, for example, a pneumatic tyre, a moulded rubber tyre, a solid tyre or generally any suitable tyre The hub 10, 210 and/or axle 22, 222 may comprise at least one of a metal including a metal alloy, a ceramic, a polymer, a fibre reinforced polymer, a fibre composite, and generally any suitable material. The spokes may comprise at least one of a metal including an alloy, a ceramic, a polymer, a fibre reinforced polymer, a fibre composite and generally any suitable material. The spokes may be, for example, described a straight pull, J pull, glued, screwed, anchored or may be generally any suitable type of spoke. Each of the plurality of spokes may be fixed to the rim by a device described as a nipple or generally any suitable anchoring device.

The rear hub 210 has attached thereto a cassette freebody 263. The side of the wheel having the cassette freebody 263 is generally referred to as the drive side (and the other side as the non-drive side). A drive ring 264 and internal bearings 267, 269 are located within the cassette freebody 263. The cassette freebody 263 is fitted on one end 254 (the drive end) of the axle 222.

A method of making an embodiment of a bicycle wheel will now be described. The method comprises the step of selecting a plurality of values for a plurality of parameters for the bicycle wheel. For example, a value for the parameters of the centreline-to-centreline separation of the plurality of spokes, the PCD, and the ERD and any other parameters disclosed herein may be selected. The method comprises the step of selecting another plurality of values for another plurality of parameters for the bicycle wheel using a pre-stressed cable strand model of the bicycle wheel. For example, the value of the spoke tension and other parameters may be selected using the tables 9 to 21. The method comprises the step of assembling bicycle wheel components in accordance with the plurality of values for the plurality of parameters and the other plurality of values for the other plurality of parameters.

Now that embodiments have been described, it will be appreciated that some embodiments may have some of the following advantages:

An embodiment may provide reduced aerodynamic drag by having a relatively reduced spoke frontal area, and/or the aerodynamically improved hub profile. These may reduce the applied power supplied by a rider to maintain a constant forward velocity, improving overall performance, conserving rider energy and improving endurance.

An embodiment may be UCI regulation 1.3.018 compliant.

An embodiment may enable a bicycle wheel compliant with regulations as stipulated by Triathlon Organisations in at least one of Australia, USA and Europe.

An embodiment may enable a bicycle wheel that is stable and stiff in the radial, lateral and torsional directions during racing conditions.

An embodiment may be manufactured at a reasonable cost using standard (or near standard) manufacturing techniques.

An embodiment may have less mass than prior art example, which may improve performance.

An embodiment may be stable under load both radially and laterally.

Embodiments may have a relatively large pitch circle diameter which may enable a bicycle wheel with increased lateral force tolerance, and decreased spoke length that may increase the stability of the bicycle wheel.

An embodiment may provide a front hub for a bicycle wheel and a rear hub for a bicycle wheel, the front hub and the rear hub having different configurations for improved bicycle performance.

Variations and/or modifications may be made to the embodiments described without departing from the spirit or ambit of the invention. For example, the hub flanges may be tapered, curved, bent or have cut-outs. The hub flanges may be integral with or detachable from the hub shell. The spokes may be metal wire spokes, carbon fibre spokes, spectra spokes, or generally made of any suitable material. The flanges may be disks, octagonal plates, or generally take any suitable form. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

ANNEXURE

TABLE 1

The frontal area of an embodiment of a wheel for various wheel flange separations.

| | centreline to centreline Flange (mm) | | | | | |
|---|---|---|---|---|---|---|
| | 30 | 40 | 50 | 60 | 70 | 80 |
| Frontal Area (mm$^2$) | 9300 | 12400 | 15550 | 18600 | 21700 | 24800 |

TABLE 2

Angle between a first plurality of spokes on one side of a bicycle hub in an embodiment of a wheel and another plurality of spokes on another side of the bicycle hub, as a function of centreline-to-centreline flange separation.

| | centreline to centreline Flange (mm) | | | | | |
|---|---|---|---|---|---|---|
| | 30 | 40 | 50 | 60 | 70 | 80 |
| Angle (degrees) | 5.54 | 7.38 | 9.22 | 11.06 | 12.88 | 14.7 |

TABLE 3

Vector analysis of radial and lateral force as a function of spoke tension in a simplified triangular truss model of an embodiment of a wheel, for a centreline-to-centreline flange separation of 30 mm.
30 mm Centreline to Centreline Flange

| Spoke Tension | | Cosine = 0.9988 Force | Sine = 0.0483 Force |
|---|---|---|---|
| kgf | N | Radial (N) | Lateral (N) |
| 100 | 981 | 979.82 | 47.38 |
| 110 | 1079.1 | 1077.81 | 52.12 |
| 120 | 1177.2 | 1175.79 | 56.86 |
| 130 | 1275.3 | 1273.77 | 61.60 |
| 140 | 1373.4 | 1371.75 | 66.34 |
| 150 | 1471.5 | 1469.73 | 71.07 |
| 160 | 1569.6 | 1567.72 | 75.81 |
| 170 | 1667.7 | 1665.70 | 80.55 |
| 180 | 1765.8 | 1763.68 | 85.29 |
| 190 | 1863.9 | 1861.66 | 90.03 |
| 200 | 1962 | 1959.65 | 94.76 |

TABLE 4

Vector analysis of radial and lateral force as a function of spoke tension, in a simplified triangular truss model of an embodiment of a wheel for a centreline-to-centreline flange separation of 40 mm.
40 mm Centreline to Centreline flange

| Spoke Tension | | Cosine = 0.9979 Force | Sine = 0.0644 Force |
|---|---|---|---|
| kgf | N | Radial (N) | Lateral (N) |
| 100 | 981 | 978.94 | 63.18 |
| 110 | 1079.1 | 1076.83 | 69.49 |
| 120 | 1177.2 | 1174.73 | 75.81 |
| 130 | 1275.3 | 1272.62 | 82.13 |
| 140 | 1373.4 | 1370.52 | 88.45 |
| 150 | 1471.5 | 1468.41 | 94.76 |
| 160 | 1569.6 | 1566.30 | 101.08 |
| 170 | 1667.7 | 1664.20 | 107.40 |
| 180 | 1765.8 | 1762.09 | 113.72 |
| 190 | 1863.9 | 1859.99 | 120.04 |
| 200 | 1962 | 1957.88 | 126.35 |

TABLE 5

Vector analysis of radial and lateral force as a function of spoke tension, in a simplified triangular truss model of an embodiment of a wheel for a centreline-to-centreline flange separation of 50 mm.
50 mm Centreline to Centreline Flange

| Spoke Tension | | Cosine = 0.9968 Force | Sine = 0.0804 Force |
|---|---|---|---|
| kgf | N | Radial (N) | Lateral (N) |
| 100 | 981 | 977.86 | 78.87 |
| 110 | 1079.1 | 1075.65 | 86.76 |
| 120 | 1177.2 | 1173.43 | 94.65 |
| 130 | 1275.3 | 1271.22 | 102.53 |
| 140 | 1373.4 | 1369.01 | 110.42 |
| 150 | 1471.5 | 1466.79 | 118.31 |
| 160 | 1569.6 | 1564.58 | 126.20 |
| 170 | 1667.7 | 1662.36 | 134.08 |
| 180 | 1765.8 | 1760.15 | 141.97 |
| 190 | 1863.9 | 1857.94 | 149.86 |
| 200 | 1962 | 1955.72 | 157.74 |

TABLE 6

Vector analysis of radial and lateral force as a function of spoke tension, in a simplified triangular truss model of an embodiment of a wheel for a centreline-to-centreline flange separation of 60 mm.
60 mm Centreline to Centreline Flange

| Spoke Tension | | Cosine = 0.9953 Force | Sine = 0.0964 Force |
|---|---|---|---|
| kgf | N | Radial (N) | Lateral (N) |
| 100 | 981 | 976.39 | 94.57 |
| 110 | 1079.1 | 1074.03 | 104.03 |
| 120 | 1177.2 | 1171.67 | 113.48 |
| 130 | 1275.3 | 1269.31 | 122.94 |
| 140 | 1373.4 | 1366.95 | 132.40 |
| 150 | 1471.5 | 1464.58 | 141.85 |
| 160 | 1569.6 | 1562.22 | 151.31 |
| 170 | 1667.7 | 1659.86 | 160.77 |
| 180 | 1765.8 | 1757.50 | 170.22 |
| 190 | 1863.9 | 1855.14 | 179.68 |
| 200 | 1962 | 1952.78 | 189.14 |

TABLE 7

Vector analysis of radial and lateral force as a function of spoke tension, in a simplified triangular truss model of an embodiment of a wheel for a centreline-to-centreline flange separation of 70 mm.
70 mm Centreline to Centreline Flange

| Spoke Tension | | Cosine = 0.9937 Force | Sine = 0.1122 Force |
|---|---|---|---|
| kgf | N | Radial (N) | Lateral (N) |
| 100 | 981 | 974.82 | 110.07 |
| 110 | 1079.1 | 1072.30 | 121.08 |
| 120 | 1177.2 | 1169.78 | 132.08 |
| 130 | 1275.3 | 1267.27 | 143.09 |
| 140 | 1373.4 | 1364.75 | 154.10 |
| 150 | 1471.5 | 1462.23 | 165.10 |
| 160 | 1569.6 | 1559.71 | 176.11 |
| 170 | 1667.7 | 1657.19 | 187.12 |
| 180 | 1765.8 | 1754.68 | 198.12 |
| 190 | 1863.9 | 1852.16 | 209.13 |
| 200 | 1962 | 1949.64 | 220.14 |

TABLE 8

Vector analysis of radial and lateral force as a function of spoke tension, in a simplified triangular truss model of an embodiment of a wheel for a centreline-to-centreline flange separation of 80 mm.
80 mm Centreline to Centreline Flange

| Spoke Tension | | Cosine = 0.9918 Force | Sine = 0.1279 Force |
|---|---|---|---|
| kgf | N | Radial (N) | Lateral (N) |
| 100 | 981 | 972.96 | 125.47 |
| 110 | 1079.1 | 1070.25 | 138.02 |
| 120 | 1177.2 | 1167.55 | 150.56 |
| 130 | 1275.3 | 1264.84 | 163.11 |
| 140 | 1373.4 | 1362.14 | 175.66 |
| 150 | 1471.5 | 1459.43 | 188.20 |
| 160 | 1569.6 | 1556.73 | 200.75 |
| 170 | 1667.7 | 1654.02 | 213.30 |
| 180 | 1765.8 | 1751.32 | 225.85 |
| 190 | 1863.9 | 1848.62 | 238.39 |
| 200 | 1962 | 1945.91 | 250.94 |

TABLE 9

The effect of spoke lacing patterns on a bicycle wheel's force components.

| | Spoke Lacing Pattern | | | | |
|---|---|---|---|---|---|
| | Radial | 1 Cross | 2 Cross | 3 Cross | 4 Cross |
| Multiplication Factor | 1 | 1.1 | 1.2 | 1.3 | 1.4 |

TABLE 10

The effect of the number of spokes on a bicycle wheel's force components.

| | Number of Spoke Holes | | | | | |
|---|---|---|---|---|---|---|
| | 16 | 20 | 24 | 28 | 32 | 36 |
| Multiplication Factor | 1 | 1.2 | 1.4 | 1.6 | 1.8 | 2 |

TABLE 11

The effect of centreline flange to centreline flange dimension on the spoke length.

| | centreline to centreline Flange (mm) | | | | | |
|---|---|---|---|---|---|---|
| | 30 | 40 | 50 | 60 | 70 | 80 |
| Spoke Length (mm) | 310.4 | 310.6 | 311 | 311.5 | 312 | 312.6 |

TABLE 12

The effect of rim depth and centreline flange to centreline flange
separation on other variables of embodiments of a bicycle wheel.

| | Rim Depth = 60 mm | | | Rim Depth = 90 mm | | | Rim Depth = 120 mm | | |
|---|---|---|---|---|---|---|---|---|---|
| | \multicolumn{9}{c}{Centreline to centreline Flange (mm)} | | | | | | | | |
| | 30 | 50 | 70 | 30 | 50 | 70 | 30 | 50 | 70 |
| Spoke Length (mm) | 250.45 | 251.25 | 252.44 | 220.51 | 221.42 | 222.77 | 190.59 | 191.64 | 193.2 |
| Angle (degrees) | 3.434 | 5.711 | 7.97 | 3.901 | 6.483 | 9.04 | 4.514 | 7.496 | 10.438 |
| Frontal Area (mm$^2$) | 7500 | 12500 | 17500 | 6600 | 11000 | 15400 | 5700 | 9500 | 13300 |

TABLE 13

Radial and lateral force components for a single spoke (left) in an embodiment
of a wheel, and the wheel's total lateral force (right) for a 16, 20, 24, 28, 32
and 36 spoke wheel as a function of spoke tension, for a centreline to centreline
flange separations of 30 mm, calculated with a pre-stressed cable and strand model.
Structural Analysis Model = Prestress cable/strand Analysis
Effect of Spoke Tension on Lateral Force
Centreline to Centreline Flange
30 mm assume wheel ERD = 620 mm          Radial Spoke Front Wheel

| Spoke Tension | | Force Radial | Force Lateral | Total Lateral Force (N) | | | | | |
|---|---|---|---|---|---|---|---|---|---|
| | | | | 16 | 20 | 24 | 28 | 32 | 36 |
| kgf | N | (N) | (N) | Spoke | Spoke | Spoke | Spoke | Spoke | Spoke |
| 100 | 981 | 981.00 | 94.96 | 759.69 | 949.61 | 1139.53 | 1329.45 | 1519.37 | 1709.29 |
| 110 | 1079.1 | 1079.10 | 104.46 | 835.66 | 1044.57 | 1253.48 | 1462.40 | 1671.31 | 1880.22 |
| 120 | 1177.2 | 1177.20 | 113.95 | 911.62 | 1139.53 | 1367.44 | 1595.34 | 1823.25 | 2051.15 |
| 130 | 1275.3 | 1275.30 | 123.45 | 987.59 | 1234.49 | 1481.39 | 1728.29 | 1975.18 | 2222.08 |
| 140 | 1373.4 | 1373.40 | 132.95 | 1063.56 | 1329.45 | 1595.34 | 1861.23 | 2127.12 | 2393.01 |
| 150 | 1471.5 | 1471.50 | 142.44 | 1139.53 | 1424.41 | 1709.29 | 1994.18 | 2279.06 | 2563.94 |
| 160 | 1569.6 | 1569.60 | 151.94 | 1215.50 | 1519.37 | 1823.25 | 2127.12 | 2431.00 | 2734.87 |
| 170 | 1667.7 | 1667.70 | 161.43 | 1291.47 | 1614.33 | 1937.20 | 2260.07 | 2582.93 | 2905.80 |
| 180 | 1765.8 | 1765.80 | 170.93 | 1367.44 | 1709.29 | 2051.15 | 2393.01 | 2734.87 | 3076.73 |
| 190 | 1863.9 | 1863.90 | 180.43 | 1443.40 | 1804.26 | 2165.11 | 2525.96 | 2886.81 | 3247.66 |
| 200 | 1962 | 1962.00 | 189.92 | 1519.37 | 1899.22 | 2279.06 | 2658.90 | 3038.75 | 3418.59 |

TABLE 14

Radial and lateral force components for a single spoke (left) in an embodiment
of a wheel, and the wheel's total lateral force (right) for a 16, 20, 24, 28, 32
and 36 spoke wheel as a function of spoke tension, for a centreline to centreline
flange separations of 40 mm, calculated with a pre-stressed cable and strand model.
Structural Analysis Model = Prestress cable/strand Analysis
Effect of Spoke Tension on Lateral Force
Centreline to Centreline Flange
40 mm assume wheel ERD = 620 mm          Radial Spoke Front Wheel

| Spoke Tension | | Force Radial | Force Lateral | Total Lateral Force (N) | | | | | |
|---|---|---|---|---|---|---|---|---|---|
| | | | | 16 | 20 | 24 | 28 | 32 | 36 |
| kgf | N | (N) | (N) | Spoke | Spoke | Spoke | Spoke | Spoke | Spoke |
| 100 | 981 | 981.00 | 126.55 | 1012.39 | 1265.49 | 1518.59 | 1771.69 | 2024.78 | 2277.88 |
| 110 | 1079.1 | 1079.10 | 139.20 | 1113.63 | 1392.04 | 1670.45 | 1948.85 | 2227.26 | 2505.67 |
| 120 | 1177.2 | 1177.20 | 151.86 | 1214.87 | 1518.59 | 1822.31 | 2126.02 | 2429.74 | 2733.46 |
| 130 | 1275.3 | 1275.30 | 164.51 | 1316.11 | 1645.14 | 1974.16 | 2303.19 | 2632.22 | 2961.25 |
| 140 | 1373.4 | 1373.40 | 177.17 | 1417.35 | 1771.69 | 2126.02 | 2480.36 | 2834.70 | 3189.03 |
| 150 | 1471.5 | 1471.50 | 189.82 | 1518.59 | 1898.24 | 2277.88 | 2657.53 | 3037.18 | 3416.82 |
| 160 | 1569.6 | 1569.60 | 202.48 | 1619.83 | 2024.78 | 2429.74 | 2834.70 | 3239.65 | 3644.61 |
| 170 | 1667.7 | 1667.70 | 215.13 | 1721.07 | 2151.33 | 2581.60 | 3011.87 | 3442.13 | 3872.40 |
| 180 | 1765.8 | 1765.80 | 227.79 | 1822.31 | 2277.88 | 2733.46 | 3189.03 | 3644.61 | 4100.19 |
| 190 | 1863.9 | 1863.90 | 240.44 | 1923.54 | 2404.43 | 2885.32 | 3366.20 | 3847.09 | 4327.98 |
| 200 | 1962 | 1962.00 | 253.10 | 2024.78 | 2530.98 | 3037.18 | 3543.37 | 4049.57 | 4555.76 |

TABLE 15

Radial and lateral force components for a single spoke (left) in an embodiment of a wheel, and the wheel's total lateral force (right) for a 16, 20, 24, 28, 32 and 36 spoke wheel as a function of spoke tension, for a centreline to centreline flange separations of 50 mm, calculated with a pre-stressed cable and strand model.
Structural Analysis Model = Prestress cable/strand Analysis
Effect of Spoke Tension on Lateral Force
Centreline to Centreline Flange
50 mm

| assume wheel ERD = 620 mm | | | Radial Spoke Front Wheel | | | | | |
|---|---|---|---|---|---|---|---|---|
| Spoke | Force | Force | Total Lateral Force (N) | | | | | |
| Tension | Radial | Lateral | 16 | 20 | 24 | 28 | 32 | 36 |
| kgf | N | (N) | (N) | Spoke | Spoke | Spoke | Spoke | Spoke | Spoke |
| 100 | 981 | 981.00 | 158.24 | 1265.88 | 1582.35 | 1898.82 | 2215.29 | 2531.76 | 2848.24 |
| 110 | 1079.1 | 1079.10 | 174.06 | 1392.47 | 1740.59 | 2088.71 | 2436.82 | 2784.94 | 3133.06 |
| 120 | 1177.2 | 1177.20 | 189.88 | 1519.06 | 1898.82 | 2278.59 | 2658.35 | 3038.12 | 3417.88 |
| 130 | 1275.3 | 1275.30 | 205.71 | 1645.65 | 2057.06 | 2468.47 | 2879.88 | 3291.29 | 3702.71 |
| 140 | 1373.4 | 1373.40 | 221.53 | 1772.24 | 2215.29 | 2658.35 | 3101.41 | 3544.47 | 3987.53 |
| 150 | 1471.5 | 1471.50 | 237.35 | 1898.82 | 2373.53 | 2848.24 | 3322.94 | 3797.65 | 4272.35 |
| 160 | 1569.6 | 1569.60 | 253.18 | 2025.41 | 2531.76 | 3038.12 | 3544.47 | 4050.82 | 4557.18 |
| 170 | 1667.7 | 1667.70 | 269.00 | 2152.00 | 2690.00 | 3228.00 | 3766.00 | 4304.00 | 4842.00 |
| 180 | 1765.8 | 1765.80 | 284.82 | 2278.59 | 2848.24 | 3417.88 | 3987.53 | 4557.18 | 5126.82 |
| 190 | 1863.9 | 1863.90 | 300.65 | 2405.18 | 3006.47 | 3607.76 | 4209.06 | 4810.35 | 5411.65 |
| 200 | 1962 | 1962.00 | 316.47 | 2531.76 | 3164.71 | 3797.65 | 4430.59 | 5063.53 | 5696.47 |

TABLE 16

Radial and lateral force components for a single spoke (left) in an embodiment of a wheel, and the wheel's total lateral force (right) for a 16, 20, 24, 28, 32 and 36 spoke wheel as a function of spoke tension, for a centreline to centreline flange separations of 60 mm, calculated with a pre-stressed cable and strand model.
Structural Analysis Model = Prestress cable/strand Analysis
Effect of Spoke Tension on Lateral Force
Centreline to Centreline Flange
60 mm

| assume wheel ERD = 620 mm | | | Radial Spoke Front Wheel | | | | | |
|---|---|---|---|---|---|---|---|---|
| Spoke | Force | Force | Total Lateral Force (N) | | | | | |
| Tension | Radial | Lateral | 16 | 20 | 24 | 28 | 32 | 36 |
| kgf | N | (N) | (N) | Spoke | Spoke | Spoke | Spoke | Spoke | Spoke |
| 100 | 981 | 981.00 | 189.82 | 1518.59 | 1898.24 | 2277.88 | 2657.53 | 3037.18 | 3416.82 |
| 110 | 1079.1 | 1079.10 | 208.81 | 1670.45 | 2088.06 | 2505.67 | 2923.28 | 3340.89 | 3758.51 |
| 120 | 1177.2 | 1177.20 | 227.79 | 1822.31 | 2277.88 | 2733.46 | 3189.03 | 3644.61 | 4100.19 |
| 130 | 1275.3 | 1275.30 | 246.77 | 1974.16 | 2467.71 | 2961.25 | 3454.79 | 3948.33 | 4441.87 |
| 140 | 1373.4 | 1373.40 | 265.75 | 2126.02 | 2657.53 | 3189.03 | 3720.54 | 4252.05 | 4783.55 |
| 150 | 1471.5 | 1471.50 | 284.74 | 2277.88 | 2847.35 | 3416.82 | 3986.29 | 4555.76 | 5125.23 |
| 160 | 1569.6 | 1569.60 | 303.72 | 2429.74 | 3037.18 | 3644.61 | 4252.05 | 4859.48 | 5466.92 |
| 170 | 1667.7 | 1667.70 | 322.70 | 2581.60 | 3227.00 | 3872.40 | 4517.80 | 5163.20 | 5808.60 |
| 180 | 1765.8 | 1765.80 | 341.68 | 2733.46 | 3416.82 | 4100.19 | 4783.55 | 5466.92 | 6150.28 |
| 190 | 1863.9 | 1863.90 | 360.66 | 2885.32 | 3606.65 | 4327.98 | 5049.31 | 5770.63 | 6491.96 |
| 200 | 1962 | 1962.00 | 379.65 | 3037.18 | 3796.47 | 4555.76 | 5315.06 | 6074.35 | 6833.65 |

TABLE 17

Radial and lateral force components for a single spoke (left) in an embodiment of a wheel, and the wheel's total lateral force (right) for a 16, 20, 24, 28, 32 and 36 spoke wheel as a function of spoke tension, for a centreline to centreline flange separations of 70 mm, calculated with a pre-stressed cable and strand model.
Structural Analysis Model = Prestress cable/strand Analysis
Effect of Spoke Tension on Lateral Force
Centreline to Centreline Flange
70 mm assume wheel ERD = 620 mm — Radial Spoke Front Wheel

| Spoke Tension | | Force Radial | Force Lateral | Total Lateral Force (N) | | | | | |
|---|---|---|---|---|---|---|---|---|---|
| | | | | 16 | 20 | 24 | 28 | 32 | 36 |
| kgf | N | (N) | (N) | Spoke | Spoke | Spoke | Spoke | Spoke | Spoke |
| 100 | 981 | 981.00 | 221.51 | 1772.08 | 2215.10 | 2658.12 | 3101.14 | 3544.16 | 3987.18 |
| 110 | 1079.1 | 1079.10 | 243.66 | 1949.29 | 2436.61 | 2923.93 | 3411.25 | 3898.57 | 4385.89 |
| 120 | 1177.2 | 1177.20 | 265.81 | 2126.49 | 2658.12 | 3189.74 | 3721.36 | 4252.99 | 4784.61 |
| 130 | 1275.3 | 1275.30 | 287.96 | 2303.70 | 2879.63 | 3455.55 | 4031.48 | 4607.40 | 5183.33 |
| 140 | 1373.4 | 1373.40 | 310.11 | 2480.91 | 3101.14 | 3721.36 | 4341.59 | 4961.82 | 5582.05 |
| 150 | 1471.5 | 1471.50 | 332.26 | 2658.12 | 3322.65 | 3987.18 | 4651.71 | 5316.24 | 5980.76 |
| 160 | 1569.6 | 1569.60 | 354.42 | 2835.33 | 3544.16 | 4252.99 | 4961.82 | 5670.65 | 6379.48 |
| 170 | 1667.7 | 1667.70 | 376.57 | 3012.53 | 3765.67 | 4518.80 | 5271.93 | 6025.07 | 6778.20 |
| 180 | 1765.8 | 1765.80 | 398.72 | 3189.74 | 3987.18 | 4784.61 | 5582.05 | 6379.48 | 7176.92 |
| 190 | 1863.9 | 1863.90 | 420.87 | 3366.95 | 4208.69 | 5050.42 | 5892.16 | 6733.90 | 7575.64 |
| 200 | 1962 | 1962.00 | 443.02 | 3544.16 | 4430.20 | 5316.24 | 6202.27 | 7088.31 | 7974.35 |

TABLE 18

Radial and lateral force components for a single spoke (left) in an embodiment of a wheel, and the wheel's total lateral force (right) for a 16, 20, 24, 28, 32 and 36 spoke wheel as a function of spoke tension, for a centreline to centreline flange separations of 80 mm, calculated with a pre-stressed cable and strand model.
Structural Analysis Model = Prestress cable/strand Analysis
Effect of Spoke Tension on Lateral Force
Centreline to Centreline Flange
80 mm assume wheel ERD = 620 mm — Radial Spoke Front Wheel

| Spoke Tension | | Force Radial | Force Lateral | Total Lateral Force (N) | | | | | |
|---|---|---|---|---|---|---|---|---|---|
| | | | | 16 | 20 | 24 | 28 | 32 | 36 |
| kgf | N | (N) | (N) | Spoke | Spoke | Spoke | Spoke | Spoke | Spoke |
| 100 | 981 | 981.00 | 253.20 | 2025.57 | 2531.96 | 3038.35 | 3544.75 | 4051.14 | 4557.53 |
| 110 | 1079.1 | 1079.10 | 278.52 | 2228.13 | 2785.16 | 3342.19 | 3899.22 | 4456.25 | 5013.28 |
| 120 | 1177.2 | 1177.20 | 303.84 | 2430.68 | 3038.35 | 3646.02 | 4253.69 | 4861.37 | 5469.04 |
| 130 | 1275.3 | 1275.30 | 329.15 | 2633.24 | 3291.55 | 3949.86 | 4608.17 | 5266.48 | 5924.79 |
| 140 | 1373.4 | 1373.40 | 354.47 | 2835.80 | 3544.75 | 4253.69 | 4962.64 | 5671.59 | 6380.54 |
| 150 | 1471.5 | 1471.50 | 379.79 | 3038.35 | 3797.94 | 4557.53 | 5317.12 | 6076.71 | 6836.29 |
| 160 | 1569.6 | 1569.60 | 405.11 | 3240.91 | 4051.14 | 4861.37 | 5671.59 | 6481.82 | 7292.05 |
| 170 | 1667.7 | 1667.70 | 430.43 | 3443.47 | 4304.33 | 5165.20 | 6026.07 | 6886.93 | 7747.80 |
| 180 | 1765.8 | 1765.80 | 455.75 | 3646.02 | 4557.53 | 5469.04 | 6380.54 | 7292.05 | 8203.55 |
| 190 | 1863.9 | 1863.90 | 481.07 | 3848.58 | 4810.73 | 5772.87 | 6735.02 | 7697.16 | 8659.31 |
| 200 | 1962 | 1962.00 | 506.39 | 4051.14 | 5063.92 | 6076.71 | 7089.49 | 8102.28 | 9115.06 |

TABLE 19

Wheel lateral force components for embodiments of a bicycle wheel having 16, 20, 24, 28, 32 and 36 spokes for various spoke tensions and PCDs for a centreline to centreline flange separations of 30 mm, calculated with a pre-stressed cable strand model.

| | | Total Lateral Force (N) | | | | | | | | |
|---|---|---|---|---|---|---|---|---|---|---|
| Force | Force | PCD = 50 mm, Radial spoke Front wheel | | | | | | PCD = 100, Radial Spoke Front Wheel | | |
| kgf | N | 16 hole | 20 hole | 24 hole | 28 hole | 32 hole | 36 hole | 16 hole | 20 hole | 24 hole |
| 100 | 981 | 826.3944 | 1032.993 | 1239.592 | 1446.19 | 1652.789 | 1859.387 | 905.8592 | 1132.074 | 1358.489 |
| 110 | 1029.1 | 909.0338 | 1136.292 | 1363.551 | 1590.809 | 1818.068 | 2015.326 | 986.2251 | 1245.281 | 1494.338 |
| 120 | 1177.2 | 991.6733 | 1239.992 | 1487.51 | 1235.428 | 1083.347 | 2231.265 | 1086.791 | 1358.489 | 1630.187 |

TABLE 19-continued

Wheel lateral force components for embodiments of a bicycle wheel having 16, 20, 24, 28, 32 and 36 spokes for various spoke tensions and PCDs for a centreline to centreline flange separations of 30 mm, calculated with a pre-stressed cable strand model.

| | | | | | | | | | | |
|---|---|---|---|---|---|---|---|---|---|---|
| 130 | 1275.3 | 1074.313 | 1342.891 | 1611.469 | 1880.047 | 2148.625 | 2417.204 | 1177.357 | 1471.896 | 1766.035 |
| 140 | 1373.4 | 1166.982 | 1446.19 | 1733.428 | 2024.666 | 2313.904 | 2603.142 | 1267.923 | 1884.904 | 1901.884 |
| 150 | 1471.5 | 1239.692 | 1549.49 | 1859.387 | 2169.285 | 2479.183 | 2789.091 | 1358.489 | 1698.111 | 2037.733 |
| 160 | 1569.8 | 1322.231 | 1652.789 | 1983.347 | 2319.904 | 2644.462 | 2975.02 | 1449.055 | 1811.318 | 2173.582 |
| 170 | 1667.7 | 1404.67 | 1736.088 | 2107.306 | 2458.323 | 2809.741 | 3160.999 | 1539.621 | 1924.526 | 2309.431 |
| 180 | 1765.8 | 1487.51 | 1859.387 | 2231.365 | 2603.142 | 2975.02 | 3346.897 | 1630.187 | 2037.788 | 24445.28 |
| 190 | 1863.9 | 1670.149 | 1962.687 | 2355.224 | 2747.761 | 3140.299 | 3532.818 | 1720.752 | 2150.941 | 2581.129 |
| 200 | 1962 | 1662.789 | 2085.986 | 2479.183 | 2892.38 | 1305.578 | 3718.775 | 1811.318 | 2264.148 | 2716.978 |

Effect of Flange PCD on Total lateral Force
Centreline to centreline flange
50 mm

| | | | | | | | | | | |
|---|---|---|---|---|---|---|---|---|---|---|
| 100 | 981 | 1376.539 | 1720.674 | 2064.809 | 2408.044 | 2753.078 | 3097.213 | 1509.17 | 1886.463 | 2263.756 |
| 110 | 1079.1 | 1514.193 | 1892.741 | 2271.29 | 2649.838 | 3028.386 | 3406.935 | 1660.087 | 2075.109 | 2490.131 |
| 120 | 1172.2 | 1651.847 | 2064.809 | 2477.771 | 2890.732 | 3303.694 | 3716.659 | 1811.004 | 2263.756 | 2716.507 |
| 130 | 1175.3 | 1789.501 | 2236.876 | 2584.261 | 3131.677 | 3579.902 | 4026.377 | 1961.922 | 2452.402 | 2942.882 |
| 140 | 1373.4 | 1927.155 | 2408.944 | 2990.732 | 3372.521 | 3854.31 | 4336.098 | 2132.999 | 2641.048 | 3169.258 |
| 150 | 1471.5 | 2064.809 | 2581.011 | 3097.213 | 3618.415 | 4129.618 | 4645.82 | 2263.756 | 2829.695 | 3395.533 |
| 160 | 1569.6 | 2202.463 | 2753.078 | 3303.694 | 3854.31 | 4404.925 | 4955.541 | 2414.673 | 3018.341 | 3622.009 |
| 170 | 1667.7 | 2340.117 | 2925.146 | 3519.176 | 4095.204 | 4680.233 | 5265.262 | 2565.59 | 3206.987 | 3848.385 |
| 180 | 1765.8 | 2477.771 | 3097.213 | 3716.666 | 4336.098 | 4955.541 | 5574.984 | 2716.507 | 3395.633 | 4074.76 |
| 190 | 1863.9 | 2615.424 | 3269.181 | 3923.137 | 4576.993 | 5230.849 | 5884.705 | 2862.424 | 3584.78 | 4301.136 |
| 200 | 1962 | 2753.078 | 3441.348 | 4129.618 | 4817.887 | 5506.157 | 6194.426 | 3018.341 | 3772.926 | 4527.511 |

| | | Total Lateral Force (N) | | | | | | | | |
|---|---|---|---|---|---|---|---|---|---|---|
| Force | Force | PCD = 100, Radial Spoke Front Wheel | | | PCD = 150, Radial Spoke Front Wheel | | | | | |
| kgf | N | 28 hole | 32 hole | 36 hole | 16 hole | 20 hole | 24 hole | 28 hole | 32 hole | 36 hole |
| 100 | 981 | 1584.904 | 1811.318 | 2037.733 | 1002.19 | 1252.737 | 1503.284 | 1753.832 | 2004.379 | 2254.927 |
| 110 | 1029.1 | 1743.394 | 1492.45 | 2241.507 | 1102.409 | 1378.011 | 1653.613 | 1929.215 | 2204.317 | 2480.419 |
| 120 | 1177.2 | 1901.834 | 2173.582 | 2445.28 | 1202.628 | 1503.284 | 1803.941 | 2404.598 | 2405.255 | 2705.912 |
| 130 | 1275.3 | 2060.375 | 2354.714 | 2649.053 | 1302.846 | 1628.558 | 1954.27 | 2279.981 | 2605.693 | 2931.405 |
| 140 | 1373.4 | 2218.865 | 2535.848 | 2852.826 | 1403.065 | 1753.932 | 2104.598 | 2455.365 | 2806.131 | 3155.897 |
| 150 | 1471.5 | 2377.355 | 2716.978 | 3056.6 | 1803.284 | 1879.106 | 2254.927 | 2630.248 | 3006.569 | 3382.39 |
| 160 | 1569.8 | 2535.846 | 2898.109 | 3260.373 | 1803.503 | 2004.379 | 2405.255 | 2806.131 | 3207.007 | 3607.883 |
| 170 | 1667.7 | 2694.336 | 3079.241 | 3464.146 | 1703.722 | 2129.653 | 2555.583 | 2981.314 | 3407.445 | 3833.375 |
| 180 | 1765.8 | 2852.826 | 3260.373 | 3667.92 | 1803.941 | 2254.927 | 2705.912 | 3156.897 | 3607.883 | 4058.368 |
| 190 | 1863.9 | 3011.317 | 3441.505 | 3871.693 | 1904.16 | 2380.2 | 2856.24 | 3332.28 | 3808.32 | 4284.362 |
| 200 | 1962 | 3169.807 | 3622.637 | 4075.466 | 2004.379 | 2506.474 | 3006.569 | 3507.664 | 4008.758 | 4509.553 |

Effect of Flange PCD on Total lateral Force
Centreline to centreline flange
50 mm

| | | | | | | | | | | |
|---|---|---|---|---|---|---|---|---|---|---|
| 100 | 981 | 2641.048 | 3018.341 | 3395.633 | 1670.054 | 2087.568 | 2505.082 | 2922.595 | 3340.109 | 3757.622 |
| 110 | 1079.1 | 2905.153 | 3320.175 | 3835.197 | 1837.06 | 2296.325 | 2755.59 | 3214.855 | 3674.12 | 4133.385 |
| 120 | 1172.2 | 3169.259 | 3622.009 | 4074.76 | 2004.066 | 2505.082 | 3006.098 | 3507.114 | 4008.131 | 4509.147 |
| 130 | 1175.3 | 3431.363 | 3023.845 | 4414.323 | 2171.071 | 2713.838 | 3256.606 | 3799.374 | 4342.141 | 4884.909 |
| 140 | 1373.4 | 3697.467 | 4225.577 | 4753.887 | 2888.076 | 2922.595 | 3507.114 | 4091.633 | 4676.152 | 5260.671 |
| 150 | 1471.5 | 3061.572 | 4527.511 | 5093.45 | 0505.082 | 3131.352 | 3757.522 | 4383.893 | 5010.163 | 5636.434 |
| 160 | 1569.6 | 4225.677 | 4829.345 | 5433.013 | 2672.087 | 3340.109 | 4008.131 | 4676.152 | 5344.174 | 6012.196 |
| 170 | 1667.7 | 4489.782 | 5131.179 | 5772.577 | 2839.092 | 3548.566 | 4258.639 | 4955.412 | 5678.185 | 6387.958 |
| 180 | 1765.8 | 4753.887 | 5435.013 | 6112.14 | 3005.098 | 3757.622 | 4500.147 | 5260.571 | 6012.196 | 6763.73 |
| 190 | 1863.9 | 5017.992 | 5734.848 | 6451.703 | 3173.103 | 3966.379 | 4759.655 | 9992.911 | 6346.207 | 7139.483 |
| 200 | 1962 | 5282.098 | 6036.682 | 6791.267 | 3340.109 | 4175.136 | 5010.163 | 5845.19 | 6680.215 | 7515.245 |

TABLE 21

Wheel lateral force components for embodiments of a bicycle wheel having 16, 20, 24, 28, 32 and 36 spokes for various spoke tensions and PCDs for a centreline to centreline flange separations of 70 mm, calculated with a pre-stressed cable strand model.

| | | Total Lateral Force (N) | | | | | | | | |
|---|---|---|---|---|---|---|---|---|---|---|
| Force | Force | PCD = 50 mm, Radial spoke Front wheel | | | | | | PCD = 100, Radial Spoke Front Wheel | | |
| kgf | N | 16 hole | 20 hole | 24 hole | 28 hole | 32 hole | 36 hole | 16 hole | 20 hole | 24 hole |
| 100 | 981 | 1927.468 | 2409.336 | 2891.203 | 3373.07 | 3854.938 | 4336.805 | 2112.682 | 2640.852 | 3169.022 |
| 110 | 1079.1 | 2120.216 | 2850.27 | 3180.324 | 3710.377 | 4240.431 | 4770.495 | 2323.95 | 2904.937 | 3485.925 |
| 120 | 1172.2 | 2312.963 | 2891.203 | 3469.444 | 4047.684 | 4625.925 | 5204.166 | 2535.218 | 3169.022 | 3802.827 |

TABLE 21-continued

Wheel lateral force components for embodiments of a bicycle wheel having 16, 20, 24, 28, 32 and 36 spokes for various spoke tensions and PCDs for a centreline to centreline flange separations of 70 mm, calculated with a pre-stressed cable strand model.

| 130 | 1275.3 | 2505.709 | 3132.137 | 3758.564 | 4384.992 | 5011.419 | 5637.846 | 2746.486 | 3433.108 | 4119.729 |
| 140 | 1373.4 | 2699.456 | 3373.07  | 4047.684 | 4722.299 | 5396.913 | 6071.527 | 2957.750 | 3697.193 | 4436.631 |
| 150 | 1471.5 | 2891.203 | 3614.004 | 4336.805 | 5059.606 | 5782.406 | 6505.207 | 3169.022 | 3061.278 | 4753.534 |
| 160 | 1569.6 | 3083.95  | 3850.938 | 4625.925 | 5396.913 | 6167.9   | 6938.888 | 3380.291 | 4225.363 | 5070.436 |
| 170 | 1667.7 | 3276.697 | 4035.371 | 4915.046 | 5734.27  | 6553.394 | 2372.568 | 3591.559 | 4489.448 | 5387.338 |
| 180 | 1765.8 | 3469.444 | 4336.805 | 5204.166 | 6071.527 | 6938.888 | 7806.249 | 3802.827 | 4758.534 | 5704.74  |
| 190 | 1863.9 | 3662.191 | 4577.738 | 5493.286 | 6408.834 | 7324.361 | 8239.929 | 4014.095 | 5017.619 | 6021.143 |
| 200 | 1962   | 3854.938 | 4818.672 | 5782.406 | 6746.141 | 7709.875 | 8573.61  | 4225.363 | 5281.704 | 6338.045 |

| | | Total Lateral Force (N) | | | | | | | | |
| --- | --- | --- | --- | --- | --- | --- | --- | --- | --- | --- |
| Force | Force | PCD = 100, Radial Spoke Front Wheel | | | PCD = 150, Radial Spoke Front Wheel | | | | | |
| kgf | N | 28 hole | 32 hole | 36 hole | 16 hole | 20 hole | 24 hole | 28 hole | 32 hole | 36 hole |
| 100 | 981    | 3697.193 | 4725.363 | 4753.534 | 2195.086 | 2743.857 | 3292.628 | 3841.4  | 4390.171 | 4938.943 |
| 110 | 1079.1 | 4066.912 | 4647.9   | 5228.887 | 2414.594 | 3018.248 | 3621.891 | 4225.54 | 4529.188 | 5432.837 |
| 120 | 1172.2 | 4436.631 | 5070.436 | 5704.24  | 2634.103 | 3292.628 | 3951.154 | 4609.68 | 5268.205 | 5926.731 |
| 130 | 1275.3 | 4806.351 | 5492.972 | 6179.594 | 2853.611 | 3567.014 | 4280.417 | 4993.82 | 5707.223 | 6420.625 |
| 140 | 1373.4 | 6176.07  | 5915.508 | 6654.947 | 3073.12  | 3841.4   | 4609.68  | 5377.96 | 6146.24  | 6914.52  |
| 150 | 1471.5 | 5545.789 | 6338.045 | 7130.3   | 3292.628 | 4115.786 | 4938.943 | 5762.1  | 6585.257 | 7408.414 |
| 160 | 1569.6 | 5915.508 | 6760.581 | 7605.654 | 3912.137 | 4390.171 | 5268.205 | 6146.24 | 7024.274 | 7902.308 |
| 170 | 1667.7 | 6288.228 | 7183.117 | 8081.007 | 5731.646 | 4664.557 | 5597.468 | 6990.38 | 7463.201 | 8396.101 |
| 180 | 1765.8 | 5554.947 | 7605.054 | 8556.36  | 3951.154 | 4938.943 | 5926.731 | 6914.52 | 7902.308 | 8890.097 |
| 190 | 1863.9 | 7024.666 | 8028.19  | 9031.714 | 4170.663 | 5213.328 | 6255.994 | 7298.66 | 8341.325 | 9383.991 |
| 200 | 1962   | 7394.386 | 8450.725 | 9507.067 | 4390.171 | 5487.714 | 6685.257 | 7282.8  | 8780.347 | 9877.885 |

The invention claimed is:

1. A method for making a bicycle wheel, the method comprising the steps of:
    selecting a plurality of values for a plurality of parameters for the bicycle wheel;
    selecting another plurality of values for another plurality of parameters for the bicycle wheel using a pre-stressed cable strand model of the bicycle wheel; and
    assembling a plurality of bicycle wheel components in accordance with the plurality of values for the plurality of parameters and the other plurality of values for the other plurality of parameters
    wherein the bicycle wheel comprises:
    a bicycle wheel hub, a rim, a first plurality of spokes attached the bicycle wheel hub and the rim and a second plurality of spokes attached to the bicycle wheel hub and the rim, wherein, the first plurality of spokes and the second plurality of spokes are on opposite sides of the bicycle wheel hub, and an angle between the first plurality of spokes and the second plurality of spokes is no more than 7 degrees;
    wherein a radial force component of each of the first plurality of spokes and the second plurality of spokes acting on the hub is greater than 5 times that of a lateral force component of each of the first plurality of spokes and the second plurality of spokes acting on the hub shell.

2. A method defined by claim 1 further comprising the steps of:
    installing the bicycle wheel on a bicycle frame a bicycle wheel.

3. A method defined by claim 1 wherein the angle between the first plurality of spokes and the second plurality of spokes is no less than 1 degree.

4. A method defined by claim 1 wherein the radial force component of each of each of the first plurality of spokes and the second plurality of spokes acting on the hub is in the range of 5 times to 50 times that of the lateral force component of each of the first plurality of spokes and the second plurality of spokes acting on the bicycle wheel hub.

5. A method defined by claim 1 wherein the bicycle wheel hub has a first bearing and a second bearing and a plurality of force transfer devices for transferring lateral clamping forces to the first bearing and the second bearing.

6. A method defined by claim 1 wherein the rim has an effective rim diameter (ERD) in the range of 300 mm to 650 mm.

7. A method defined by claim 6 wherein the ERD is between 450 mm and 650 mm.

8. A method defined by claim 1 configured to comply with UCI regulation 1.3.018 in effect as of Feb. 12, 2015.

9. A method defined by claim 8 comprising a bicycle fork engager between which the hub is disposed.

10. A method defined by claim 9 wherein the bicycle fork engager is configured for a bicycle fork compliant with UCI regulation 1.3.017 in effect as of Feb. 12, 2015.

11. A method defined by claim 10 wherein the bicycle fork engager is configured for a front wheel and for a bicycle fork having two arms that are separated by no more than 105 mm.

12. A method defined by claim 10 wherein the bicycle fork engager is configured for a rear wheel and for a bicycle fork having two arms that are separated by no more than 135 mm.

13. The bicycle wheel of claim 1 wherein each of the first plurality of spokes and the second plurality of spokes has a tension of between 500 N and 3000 N.

14. The bicycle wheel of claim 1 wherein each of the first plurality of spokes and the second plurality of spokes has a length of between 120 mm and 335 mm.

15. A method defined by claim 1 wherein the rim has a rim depth in the range of 20 mm to 150 mm.

* * * * *